United States Patent [19]

Wakita et al.

[11] 4,445,169

[45] Apr. 24, 1984

[54] SEQUENCE DISPLAY APPARATUS AND METHOD

[75] Inventors: Tadayoshi Wakita, Ichihara; Minoru Suzuki, Kamakura; Sadao Yanada, Hitachi; Sigeru Sibata, Iwaki, all of Japan

[73] Assignees: The Tokyo Electric Co., Inc.; Hitachi Engineering Ltd; Hitachi, Ltd., all of Tokyo, Japan

[21] Appl. No.: 273,037

[22] Filed: Jun. 12, 1981

[30] Foreign Application Priority Data

Jun. 13, 1980 [JP] Japan ................................ 55-78971
Jun. 13, 1980 [JP] Japan ................................ 55-78972

[51] Int. Cl.[3] ......................... G06F 15/46; G06F 9/00

[52] U.S. Cl. .................................... 364/147; 364/136; 364/521; 364/900

[58] Field of Search ............... 364/200, 900, 136, 147, 364/521; 340/711, 712

[56] References Cited

U.S. PATENT DOCUMENTS

| | | | |
|---|---|---|---|
| 3,593,316 | 7/1971 | Frieband | 364/900 |
| 3,624,611 | 11/1971 | Wirsing | 364/200 |
| 3,686,639 | 8/1972 | Fletcher et al. | 364/200 |
| 3,849,765 | 11/1974 | Hamano | 364/200 |
| 3,879,722 | 4/1975 | Knowlton | 340/712 X |
| 3,924,242 | 12/1975 | Naud | 364/200 |
| 3,938,104 | 2/1976 | Henry et al. | 364/900 |

FOREIGN PATENT DOCUMENTS

| | | | |
|---|---|---|---|
| 55-88102 | 7/1980 | Japan | 364/136 |
| 55-88103 | 7/1980 | Japan | 364/136 |
| 55-124806 | 9/1980 | Japan | 364/136 |
| 55-162107 | 12/1980 | Japan | 364/136 |

*Primary Examiner*—Felix D. Gruber
*Attorney, Agent, or Firm*—Antonelli, Terry & Wands

[57] ABSTRACT

A sequence display apparatus including a sequence control circuit, a cathode ray tube control device and a sequence display control device is disclosed in which a keyboard included in the sequence display control device is provided with logical function specifying keys for specifying one of a plurality of logical functions corresponding to such logical circuits as AND, OR and flip-flop circuits and a timer and with keys for inputting the names of input signals and the name of an output signal. One logic function, all of the names of the input signals and the name of the output signal are inputted as one set by the key-in operation, each of a group of command codes which are determined by the kind of logical function and the number of the names of input signals, is added to a corresponding one of the names of the input signals and the name of the output signal which have been inputted, to compose a logical operation program. The names of input signals are collectively displayed at a left end part of the display surface of a cathode ray tube, a position on the display surface for displaying the logic symbol is determined in accordance with the number of input signals, and the arrangement of a line for connecting each of the names of the input signals and the logic symbol is determined on the basis of the state of the display at each of the picture elements forming the display surface.

13 Claims, 81 Drawing Figures

| | |
|---|---|
| COMMAND CODE CC | ADDRESS CODE AC |

FIG. 5

| SYMBOL OF COMMAND CODE | | | CONTENT OF PROCESSING |
|---|---|---|---|
| FOR READING SIGNAL | | S | STORE n(DATA AT INDICATED ADDRESS n) IN ACC |
| | | $ | STORE NEGATIVE OF n($\bar{n}$) IN ACC |
| FOR LOGIC | AND | * | TAKE AND OF n AND ACC AND PLACE IT IN ACC |
| | | / | TAKE AND OF $\bar{n}$ (NEGATIVE OF n) AND ACC AND PLACE IT IN ACC |
| | OR | + | TAKE OR OF n AND ACC AND PLACE IT IN ACC |
| | | − | TAKE OR OF $\bar{n}$(NEGATIVE OF n) AND ACC AND PLACE IT IN ACC |
| | FF | ON | IF ACC=1, LET n=1; IF ACC=0 LET n INVARIANT |
| | | OFF | IF ACC=1, LET n=0; IF ACC=0 LET n INVARIANT |
| FOR WRITING SIGNAL | | = | TRANSFER n INTO ACC |

FIG. 6

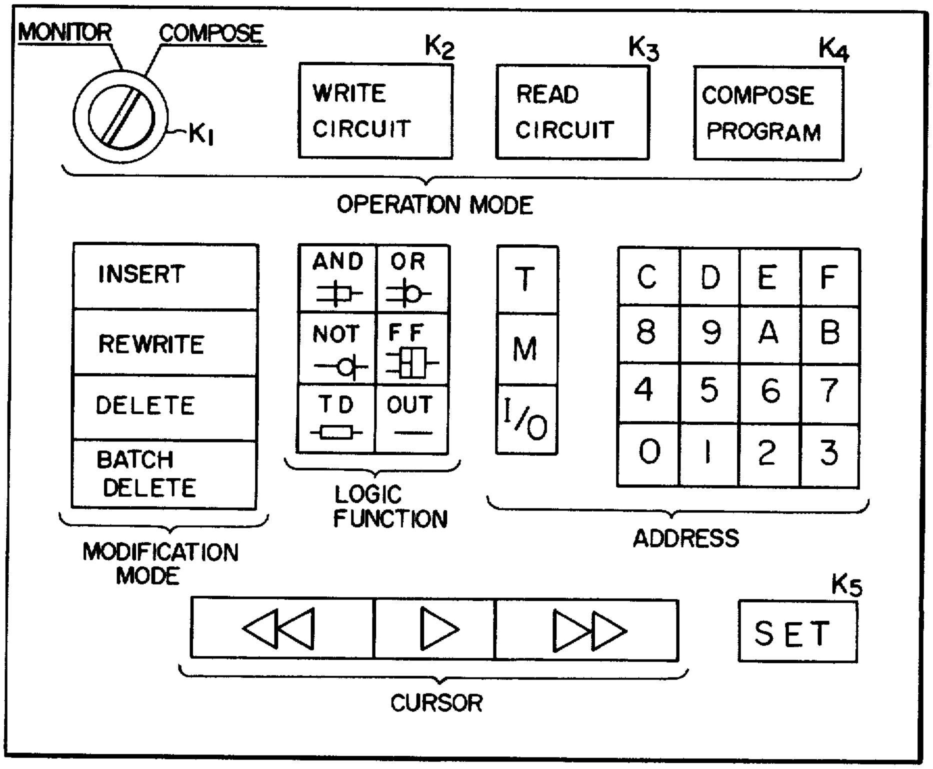

KEYBOARD OPERATION
AND 1
AND 2
TD
FF
OR

BM 1 AT STEP S26
(AND 1)
(AND 2)
(TD)
(FF)
(OR)
ROW 1
ROW 2
ROW 3
ROW 4
ROW 5
ROW 6

BM 1 AT STEP S29

BM 1 AFTER DETERMINATION OF CC (S37)

| | 2-INPUT AND | 3-INPUT AND | 2-INPUT OR | 3-INPUT OR | FF | TD |
|---|---|---|---|---|---|---|
| BASIC PATTERN | S / ✱ / = | S / ✱ / ✱ / = | S / + / = | S / + / + / = | S / ON / S / OFF | S / = |
| NEGATIVE OF FIRST INPUT | S ⟶ $ | | | | | |
| NEGATIVE OF SECOND, THIRD INPUT | ✱ ⟶ / | | + ⟶ − | | S ⟶ $ (SECOND OCCURRING S) | NONE |

TABLE TB2

| | |
|---|---|
| I/O 001 | |
| START POINT | (4, 5) |
| END POINT | (4, 6) |
| TURN POINT | —— |
| I/O 002 | |
| START POINT | (6, 5) |
| END POINT | (6, 6) |
| TURN POINT | —— |
| M 001 | |
| START POINT | (5, 12) |
| END POINT | (8, 20) |
| TURN POINT | (5, 16) |
| TURN POINT | (8, 16) |
| | ⋮ |

TABLE TB3 (L →, M ↓)

| M \ L | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|
| 4 | 0 | 0 | 1 | 1 | 1 | 1 | 1 | 0 | 0 | 0 | 0 | 0 | 0 | 0 | 0 | 0 |
| 5 | 0 | 0 | 1 | 1 | 1 | 1 | 1 | 0 | 0 | 0 | 0 | 1 | 0 | 0 | 0 | 0 |
| 6 | 0 | 0 | 1 | 1 | 1 | 1 | 1 | 0 | 0 | 0 | 0 | 1 | 0 | 0 | 0 | 0 |
| 7 | 0 | 0 | 0 | 0 | 0 | 0 | 0 | 0 | 0 | 0 | 0 | 1 | 0 | 0 | 0 | 0 |
| 8 | 0 | 0 | 0 | 0 | 0 | 0 | 0 | 0 | 0 | 0 | 0 | 1 | 0 | 0 | 0 | 0 |
| 9 | 0 | 0 | 0 | 0 | 0 | 0 | 0 | 0 | 0 | 0 | 0 | 0 | 0 | 0 | 0 | 0 |

TABLE TB4 (L →, M ↓)

| M \ L | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|
| 4 | 1 | 1 | 1 | 1 | 1 | 1 | 1 | 0 | 0 | 0 | 0 | 0 | 0 | 0 | 0 | 0 |
| 5 | 0 | 0 | 1 | 1 | 1 | 1 | 1 | 1 | 1 | 1 | 1 | 1 | 0 | 0 | 0 | 0 |
| 6 | 1 | 1 | 1 | 1 | 1 | 1 | 1 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 1 | 1 | 1 | 1 | 1 |
| 9 | 0 | 0 | 0 | 0 | 0 | 0 | 0 | 0 | 0 | 0 | 0 | 0 | 0 | 0 | 0 | 0 |

FIG. 14

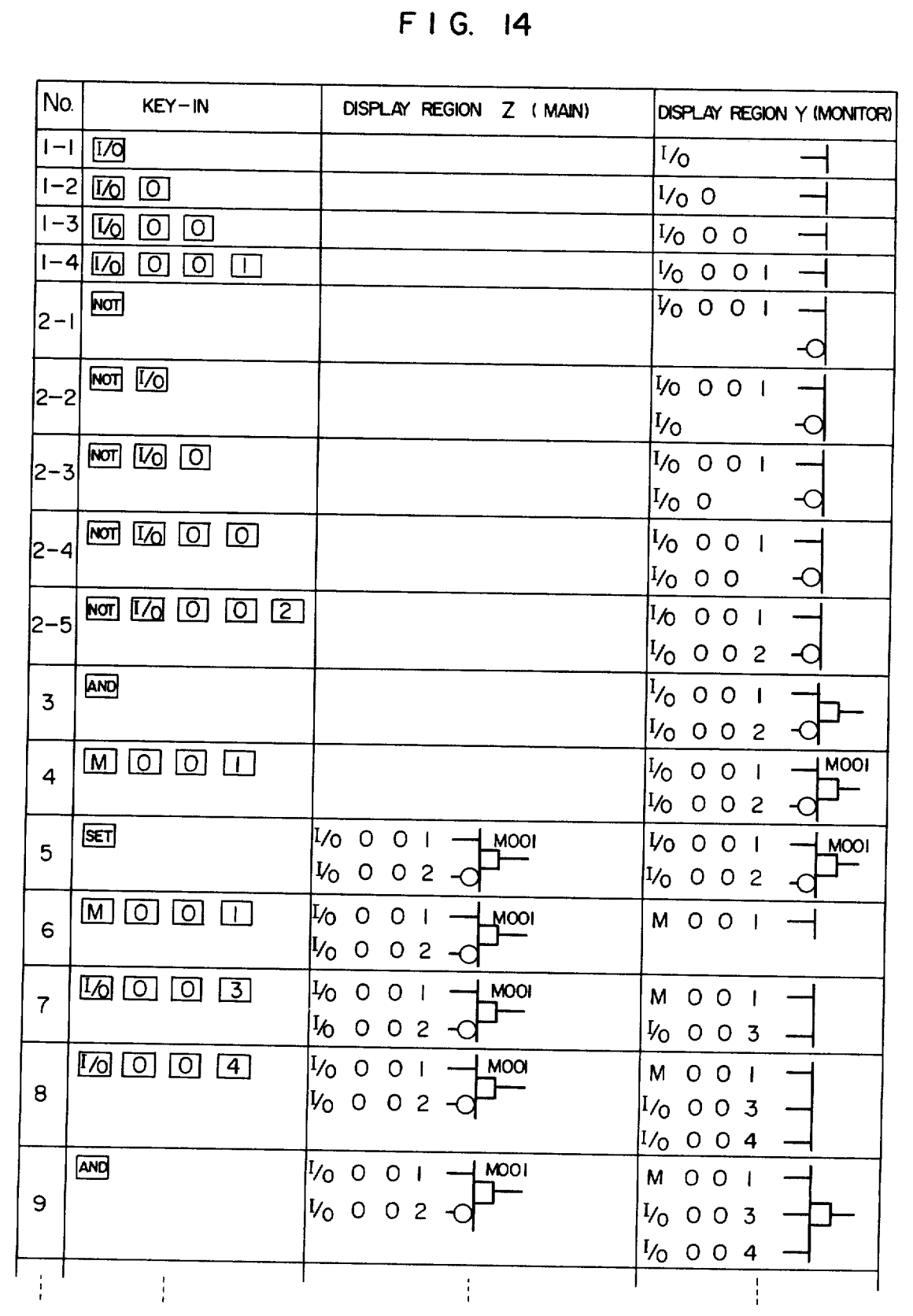

| No. | KEY-IN | DISPLAY REGION Z (MAIN) | DISPLAY REGION Y (MONITOR) |
|---|---|---|---|
| 1-1 | [I/O] | | I/O |
| 1-2 | [I/O] [0] | | I/O 0 |
| 1-3 | [I/O] [0] [0] | | I/O 0 0 |
| 1-4 | [I/O] [0] [0] [1] | | I/O 0 0 1 |
| 2-1 | [NOT] | | I/O 0 0 1 |
| 2-2 | [NOT] [I/O] | | I/O 0 0 1<br>I/O |
| 2-3 | [NOT] [I/O] [0] | | I/O 0 0 1<br>I/O 0 |
| 2-4 | [NOT] [I/O] [0] [0] | | I/O 0 0 1<br>I/O 0 0 |
| 2-5 | [NOT] [I/O] [0] [0] [2] | | I/O 0 0 1<br>I/O 0 0 2 |
| 3 | [AND] | | I/O 0 0 1<br>I/O 0 0 2 |
| 4 | [M] [0] [0] [1] | | I/O 0 0 1 M001<br>I/O 0 0 2 |
| 5 | [SET] | I/O 0 0 1 M001<br>I/O 0 0 2 | I/O 0 0 1 M001<br>I/O 0 0 2 |
| 6 | [M] [0] [0] [1] | I/O 0 0 1 M001<br>I/O 0 0 2 | M 0 0 1 |
| 7 | [I/O] [0] [0] [3] | I/O 0 0 1 M001<br>I/O 0 0 2 | M 0 0 1<br>I/O 0 0 3 |
| 8 | [I/O] [0] [0] [4] | I/O 0 0 1 M001<br>I/O 0 0 2 | M 0 0 1<br>I/O 0 0 3<br>I/O 0 0 4 |
| 9 | [AND] | I/O 0 0 1 M001<br>I/O 0 0 2 | M 0 0 1<br>I/O 0 0 3<br>I/O 0 0 4 |

FIG. 16A (1 UNUSED INPUT)
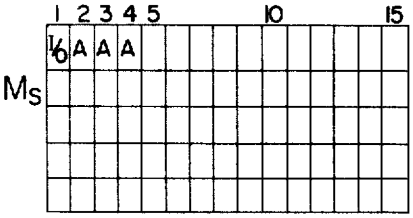
FIG. 16B (2 UNUSED INPUTS)
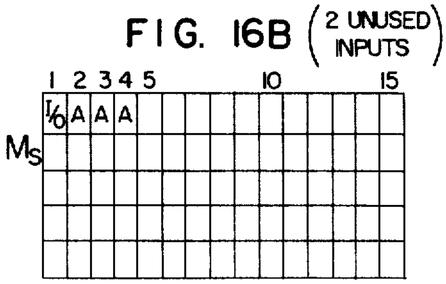
FIG. 16C (3 UNUSED INPUTS)
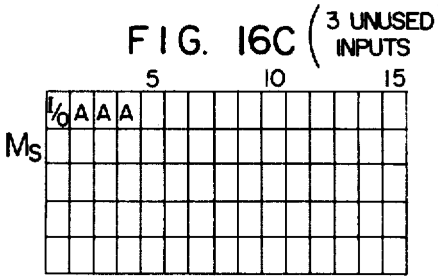
FIG. 16D (1 INPUT 1 USED)
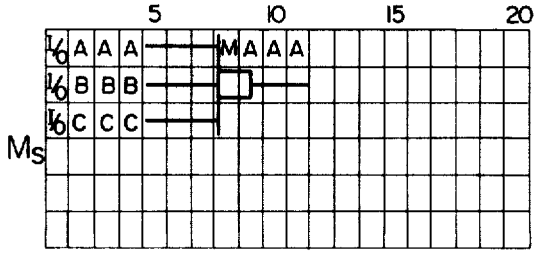
FIG. 16E (2 INPUTS 1 USED)
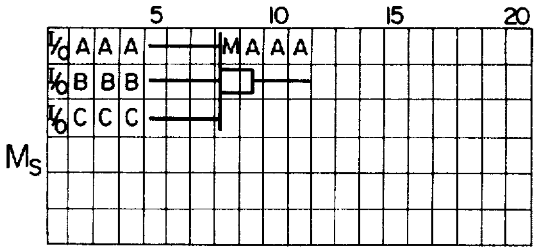
FIG. 16F (2 INPUTS 2 USED)
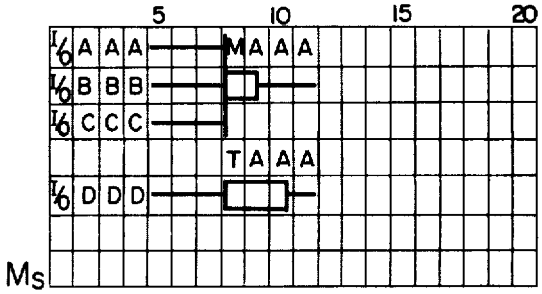
FIG. 16G (3 INPUTS 1 USED)
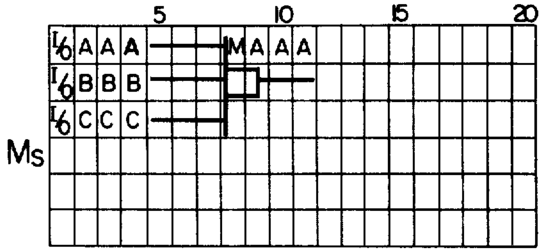
FIG. 16H (3 INPUTS 2 USED)
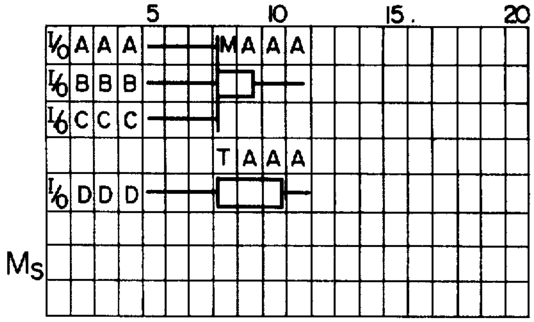
FIG. 16I (3 INPUTS 3 USED)
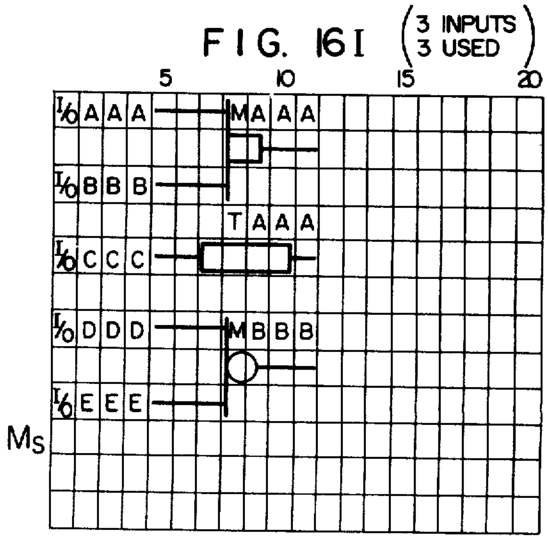

FIG. 17A (1 UNUSED INPUT)
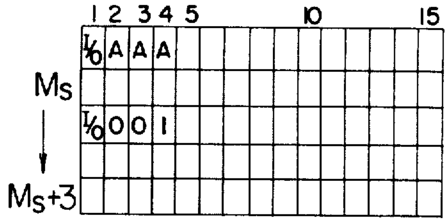
FIG. 17B (2 UNUSED INPUTS)
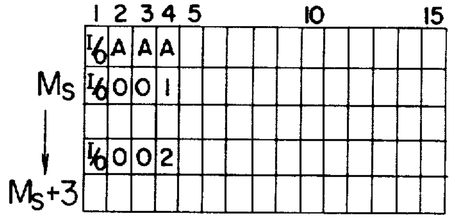
FIG. 17C (3 UNUSED INPUTS)
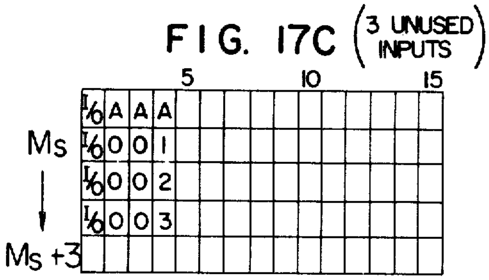
FIG. 17D (1 INPUT 1 USED)
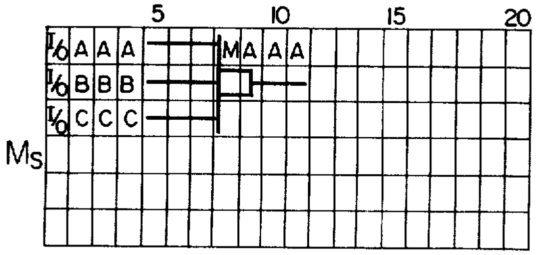
FIG. 17E (2 INPUTS 1 USED)
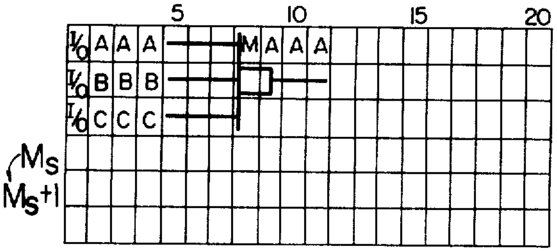
FIG. 17F (2 INPUTS 2 USED)
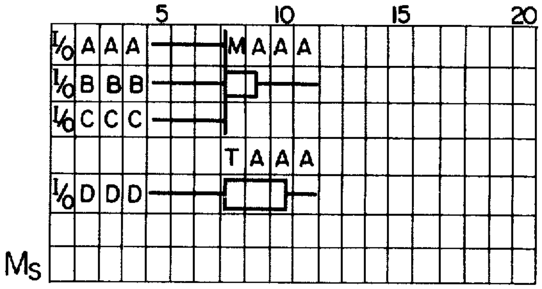
FIG. 17G (3 INPUTS 1 USED)
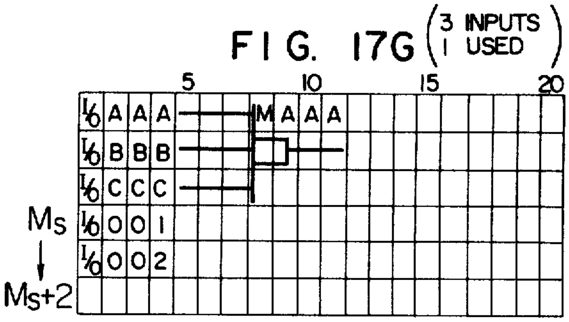
FIG. 17H (3 INPUTS 2 USED)
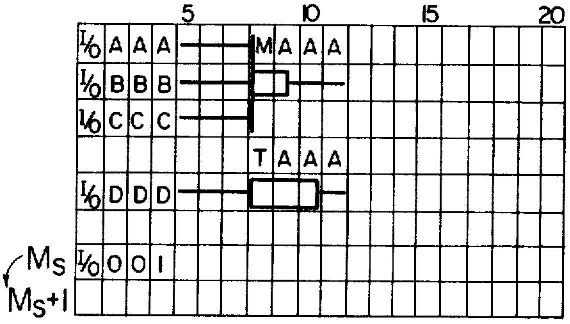
FIG. 17I (3 INPUTS 3 USED)
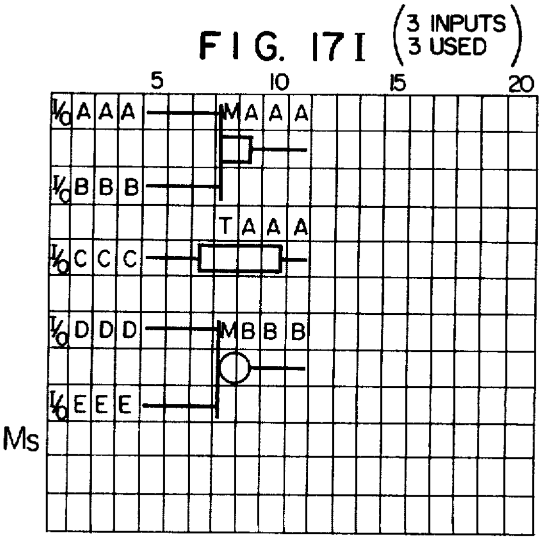

FIG. 18A (1 UNUSED INPUT)
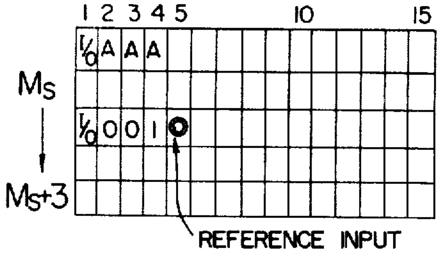
FIG. 18B (2 UNUSED INPUTS)
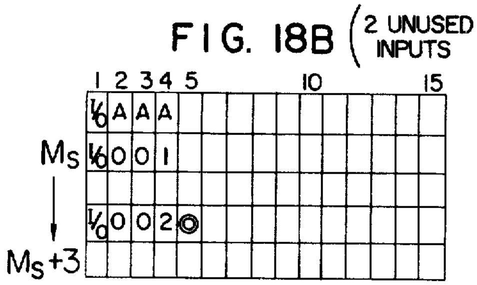
FIG. 18C (3 UNUSED INPUTS)
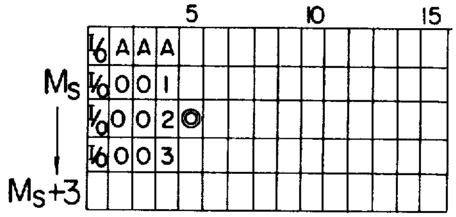
FIG. 18D (1 INPUT 1 USED)
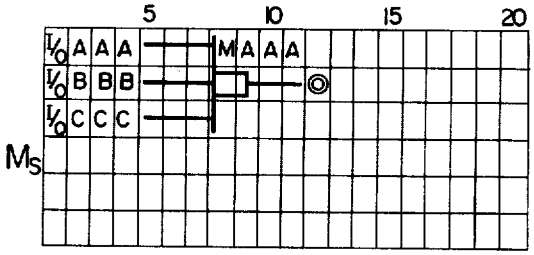
FIG. 18E (2 INPUTS 1 USED)
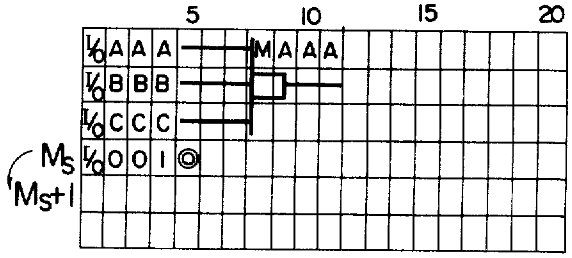
FIG. 18F (2 INPUTS 2 USED)
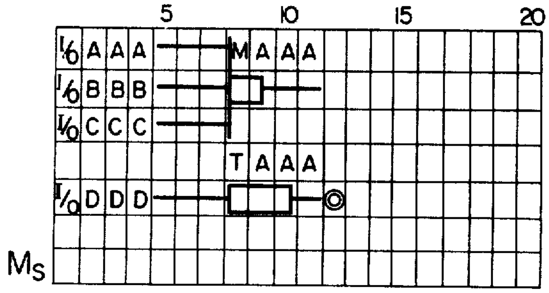
FIG. 18G (3 INPUTS 1 USED)
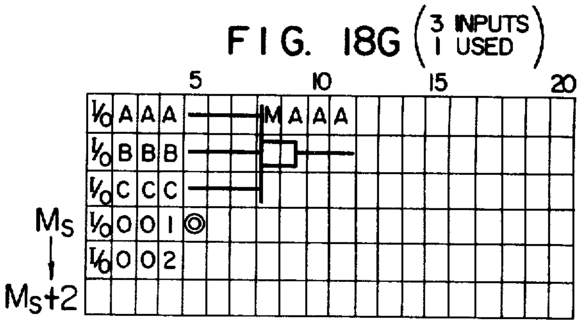
FIG. 18H (3 INPUTS 2 USED)
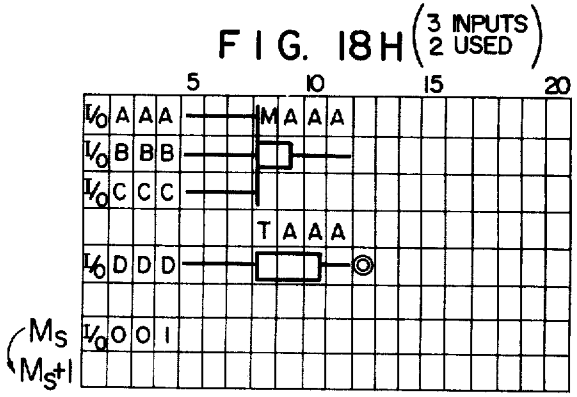
FIG. 18 I (3 INPUTS 3 USED)
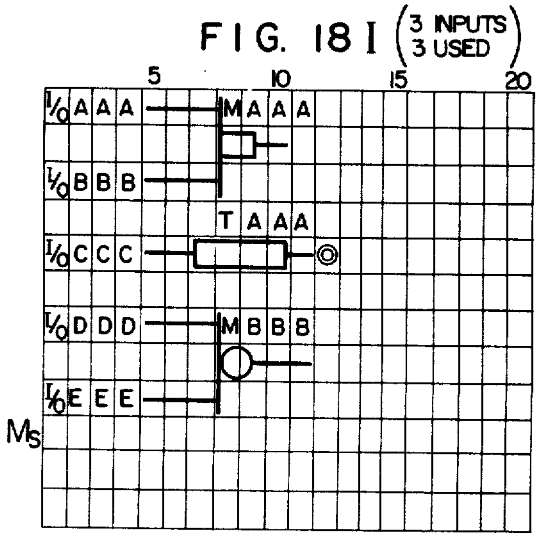

FIG. 19A (1 UNUSED INPUT)
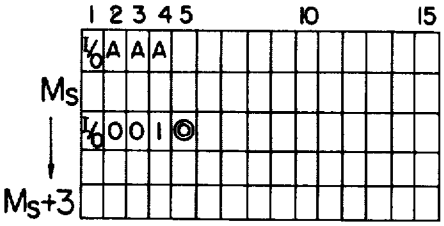
FIG. 19B (2 UNUSED INPUTS)
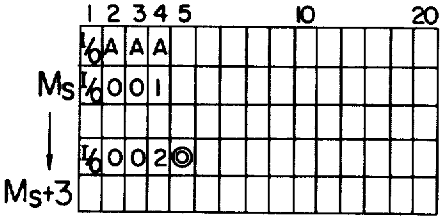
FIG. 19C (3 UNUSED INPUTS)
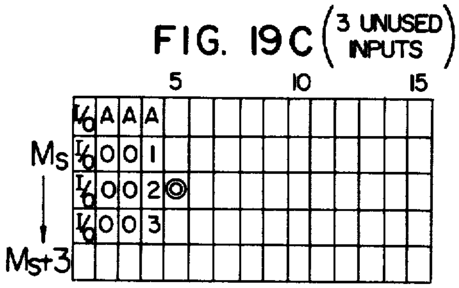
FIG. 19D (1 INPUT 1 USED)
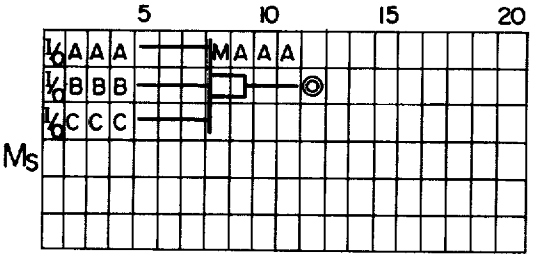
FIG. 19E (2 INPUTS 1 USED)
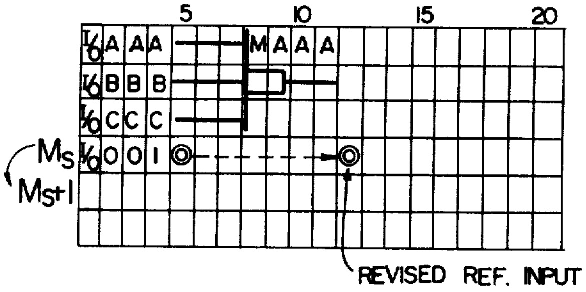
FIG. 19F (2 INPUTS 2 USED)
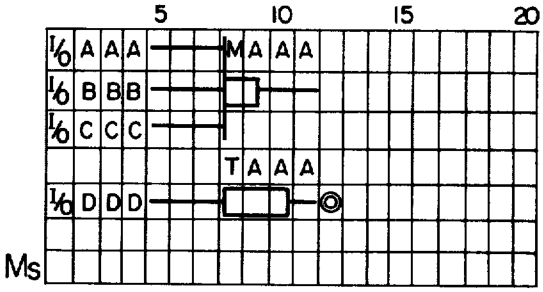
FIG. 19G (3 INPUTS 1 USED)
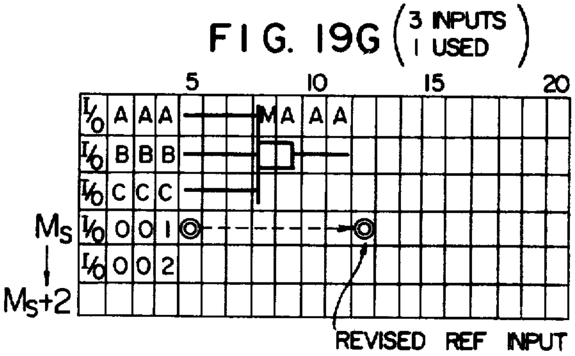
FIG. 19H (3 INPUTS 2 USED)
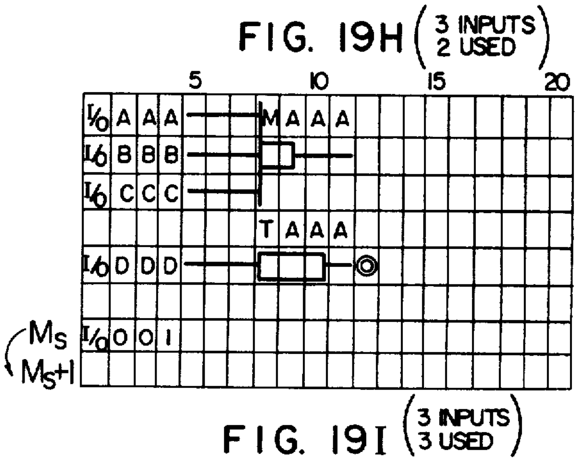
FIG. 19I (3 INPUTS 3 USED)
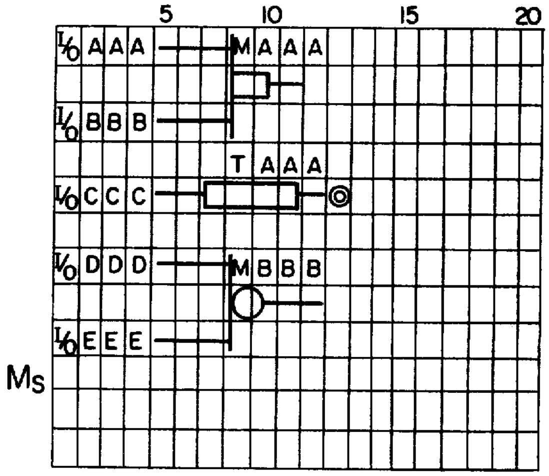

FIG. 20A (1 UNUSED INPUT)
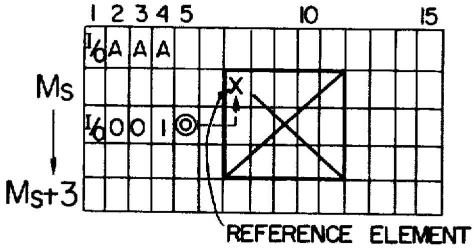
FIG. 20B (2 UNUSED INPUTS)
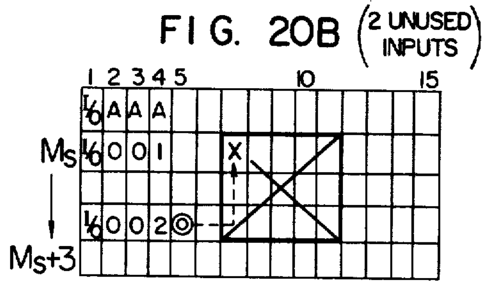
FIG. 20C (3 UNUSED INPUTS)
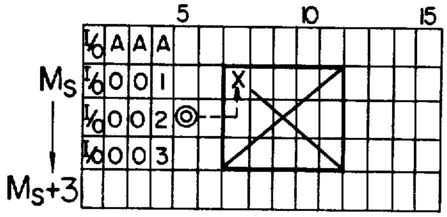
FIG. 20D (1 INPUT 1 USED)
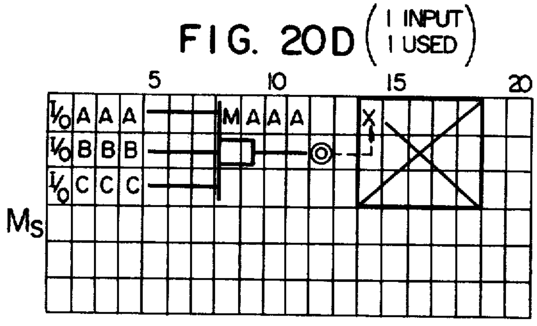
FIG. 20E (2 INPUTS 1 USED)
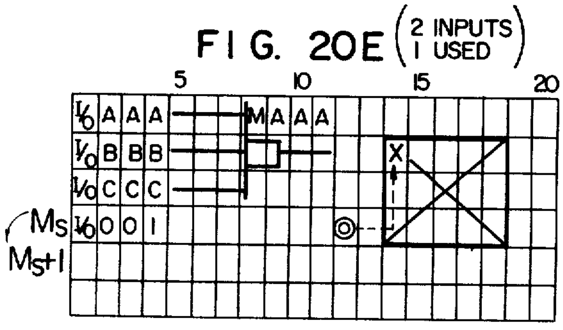
FIG. 20F (2 INPUTS 2 USED)
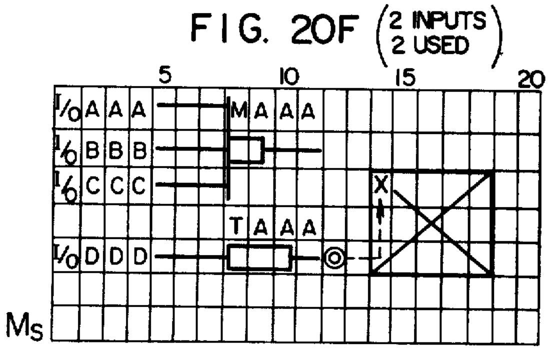
FIG. 20G (3 INPUTS 1 USED)
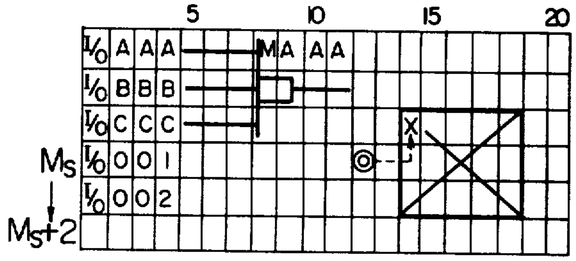
FIG. 20H (3 INPUTS 2 USED)
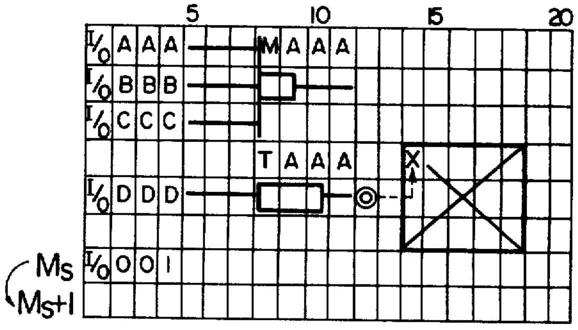
FIG. 20 I (3 INPUTS 3 USED)
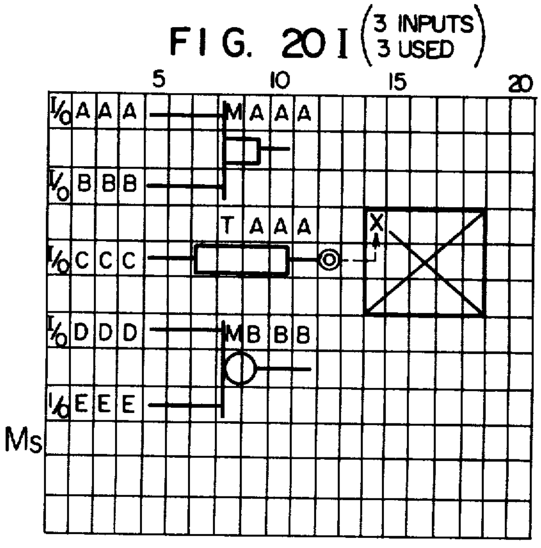

FIG. 21
| | | | | |
|---|---|---|---|---|
| S | 3 | 7 | 14 | |
| 1 | 2 | 8 | 15 | |
| 4 | 5 | 6 | 16 | |
| 10 | 11 | 12 | 13 | |
| | | | | |
FIG. 22A (1 TURN)
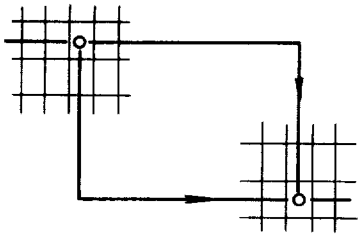
FIG. 22B (2 TURNS)
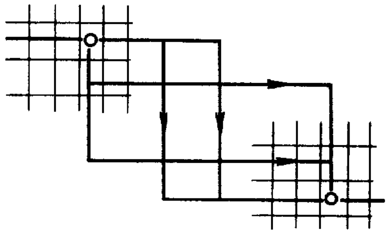
FIG. 22C (3 TURNS)
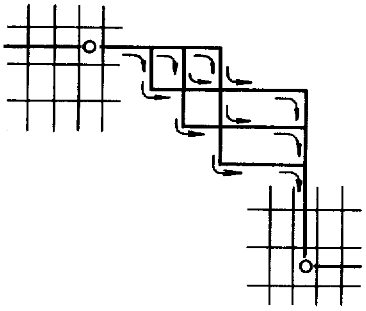
FIG. 22D (3 TURNS)
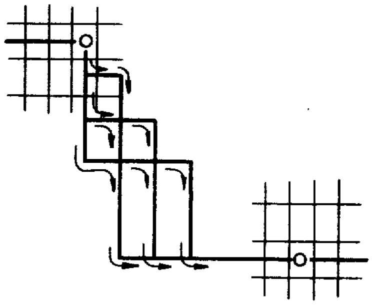

FIG. 23A (1 UNUSED INPUT)
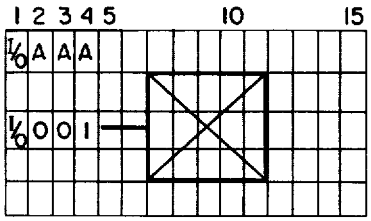
FIG. 23B (2 UNUSED INPUTS)
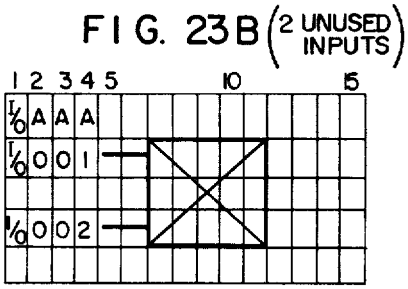
FIG. 23C (3 UNUSED INPUTS)
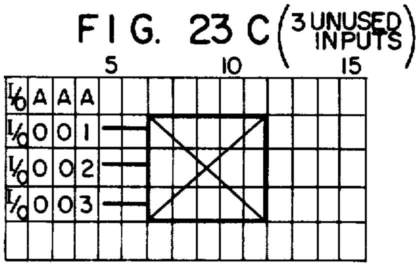
FIG. 23D (1 INPUT 1 USED)
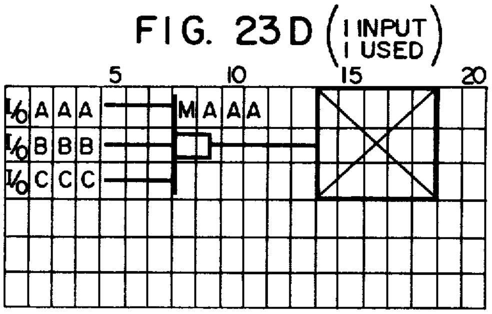
FIG. 23E (2 INPUTS 1 USED)
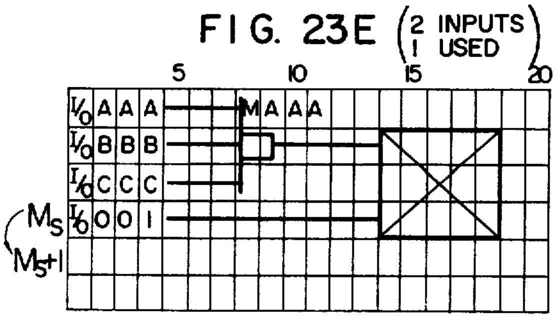
FIG. 23F (2 INPUTS 2 USED)
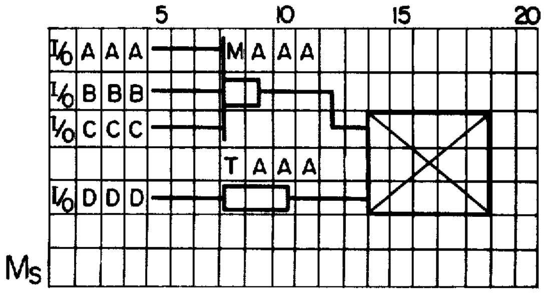
FIG. 23G (3 INPUTS 1 USED)
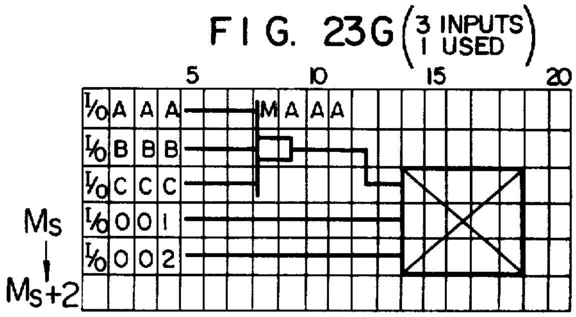
FIG. 23H (3 INPUTS 2 USED)
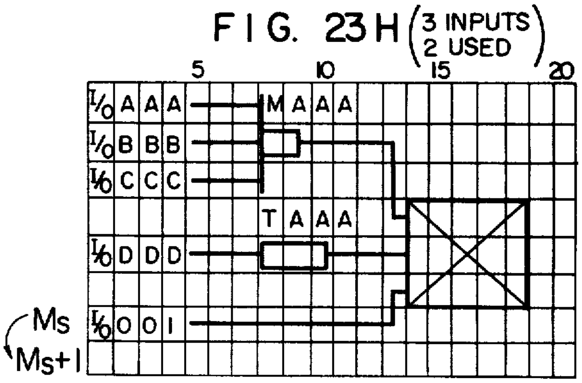
FIG. 23I (3 INPUTS 3 USED)
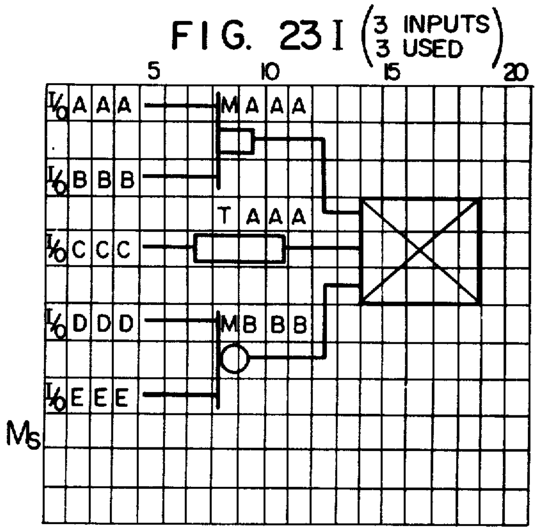

SEQUENCE DISPLAY APPARATUS AND METHOD

BACKGROUND OF THE INVENTION

The present invention relates to an apparatus for and a method of displaying sequential processing, and more particularly to a display apparatus and a display method suitable for use in the case where sequential processing is displayed on the display surface of a cathode ray tube by logic symbols.

There have been widely employed sequential control devices in which signals are supplied to a controlled system in a predetermined order to control the system. In recent years, most sequential control devices have been designed to include a digital computer for conducting sequential control. That is, such devices perform logical operations on the basis of a program. Accordingly, the sequential control devices are required, from the user's side, to be designed such that the contents of sequential processing can be readily modified by an operator who is skilled in sequential control techniques but lacks the knowledge of digital computers and programming. To satisfy the above requirement, a sequence display control unit including a CRT control unit having a CRT for providing a display on the display surface of the CRT are added to the sequential control device for achieving appropriate display of the sequence control.

The sequence display control unit is a sort of language compiler, which converts sequence symbols inputted through a key-in operation into programs and simultaneously displays sequence symbols corresponding to the programs on the display surface of a cathode ray tube through the CRT control unit. Therefore, an operator can design a desired sequence control while observing a corresponding logical circuit diagram displayed on the display surface of the cathode ray tube. When the logical circuit diagram thus formed is a satisfactory one, keying-in the consent approval of the diagram will store the programs corresponding to such a series of logical circuits in the sequential control device and subsequent control operations on the controlled system are performed on the basis of the newly formed programs.

The present invention relates to display of a logical circuit on the display surface of a cathode ray tube in such a sequence display control device. In a conventional system, a ladder display has been employed in which a bus bar is displayed at each end of the display surface, and symbols of contacts are arranged in series or parallel between the above bus bars. The ladder display system has been widely employed, but is not suited to display complicated circuits.

SUMMARY OF THE INVENTION

Accordingly, it is an object of the present invention to provide a display apparatus and a display method for displaying logic symbols, associated with inputs and an output, capable of displaying complicated sequential processing.

According to an aspect of the present invention which attains the above object, a keyboard is provided with keys for specifying various logical functions and keys for specifying the name of an input signal and the name of an output signal so that one logical function is inputted together with all of the names of input signals and the name of the output signal by a key-in operation. Further, the inputted information is converted into programs to conduct sequential processing, and the programs are analyzed to display the inputted information on the display surface of the cathode ray tube as a combinations of logic symbols, the names of an input signal or signals and an output signal associated with the logic symbols, and connection lines between the logic symbols.

BRIEF DESCRIPTION OF THE DRAWINGS

FIG. 5 is a diagram which shows the kind and function of command codes.

FIG. 6 is a diagram which shows various keys provided on a keyboard of FIG. 2.

FIG. 14 is a diagram which shows the relation between a key-in operation and the contents displayed in the display regions Y and Z of the cathode ray tube shown in FIG. 13.

FIGS. 16A to 16I are diagrams which show display patterns on the display surface of cathode ray tube after the processing in step $S_{46}$ shown in FIG. 12.

FIGS. 17A to 17I are diagrams which show display patterns on the display surface of cathode ray tube after the processing in step $S_{52}$ shown in FIG. 12 and when the names of input signal have been displayed.

FIGS. 18A to 18I are diagrams which show various locations of reference input signal line after the processing in steps $S_{57}$, $S_{58}$ and $S_{59}$ shown in FIG. 12.

FIGS. 19A to 19I are diagrams which show various locations of reference input signal line after the processing in steps $S_{60}$ and $S_{61}$ shown in FIG. 12.

FIGS. 20A to 20I are diagrams which show various positions of the reference picture element of symbol block after the processing in steps $S_{62}$, $S_{63}$ and $S_{64}$ shown in FIG. 12.

FIG. 21 is a schematic diagram for illustrating a way of modifying a symbol block display position.

FIGS. 22A to 22D are diagrams which show various ways of connecting two terminals.

FIGS. 23A to 23I are diagrams which show final display patterns on the display surface of cathode ray tube.

DESCRIPTION OF THE PREFERRED EMBODIMENT

In accordance with the present invention, logic symbols indicating such logical functions as AND, OR and NOT are employed to display sequential processing. In this case, the logic symbols are required to be appropriately located in the display surface of the cathode ray tube. In more detail, in the ladder display system, contacts are connected in series to provide a logical product, and are connected in parallel to provide a logical sum. Accordingly, if only the distance on the display surface between two contacts is specified, the position of the next contact is automatically specified, and therefore it is not required to take into consideration the location of the contacts. On the other hand, in the logic symbol display system, since the number of input signals associated with a logic symbol is variable, the position of the output signal line from the logic symbol is not determined automatically, and the position of the next logic symbol has to be considered when the position of the output signal line is determined.

Figure 1:
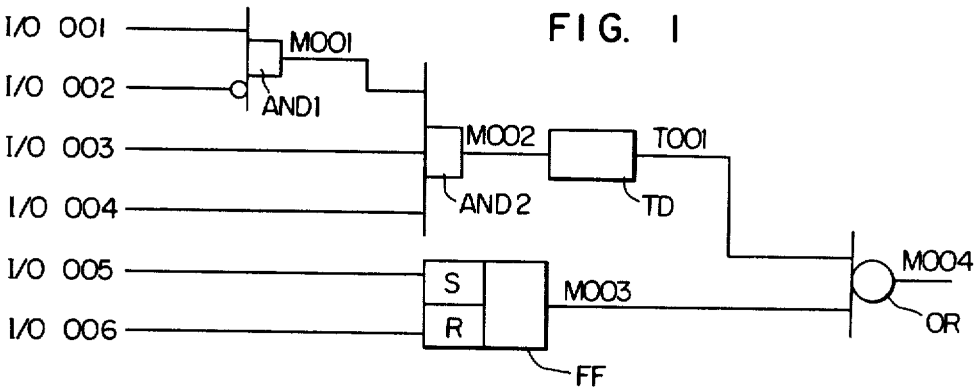
FIG. 1 is a diagram which shows an example of a logical circuit diagram to be displayed in a display apparatus according to the present invention.

Now, explanation will be made of an embodiment of the present invention which is adapted to display sequential processing by logic symbols, and of the case where the logical circuit shown in FIG. 1 is to be displayed on the display surface of the cathode ray tube, by way of example.

In FIG. 1, reference symbol AND designates a logical product circuit, OR a logical sum circuit, TD a time delaying circuit, and FF a flip-flop circuit. Further, reference symbols I/O 001 to I/O 006 designate names given to individual input signals and also indicate memory addresses storing these input signals, and M001 to M004 and T001 designate names given to signals obtained by logical operations and also indicate memory addresses storing these signals. Referring to FIG. 1, a logical product of data stored at the address I/O 001 and the negative or negation of data stored at the address I/O 002 is given by the circuit AND 1 and is stored at the address M 001. (A symbol "○" given to the second input terminal of the circuit AND 1 designates the negation "NOT".) A logical product of three data signals stored respectively at addresses M 001, I/O 003 and I/O 004 is given by the circuit AND 2 and is stored at the address M 002. The timer TD sends an output to the address T 001 when a predetermined time has elapsed after the level of the input signal thereto was changed from "1" to "0", or from "0" to "1", and the level of the output thereof is equal to the input level after the above change. Data stored at the address I/O 005 and data stored at the address I/O 006 are inputted to the set terminal S and reset terminal R of the flip-flop circuit FF, respectively, and the output from the circuit FF is stored at the address M 003. A logical sum of the two data signals stored respectively at the addresses T 001 and M 003 is given by the circuit OR and is stored at the address M004. In FIG. 1, the negation "NOT" is indicated by the symbol "○" given to the second input terminal of the logical product circuit AND 1. The negation can be indicated in a similar manner in such other logical circuits as the logical sum circuit OR, the timer TD and the flip-flop circuit FF. That is, the negation is expressed by giving the symbol "○" to an input terminal of these logical circuits. Incidentally, the number of inputs given to the timer TD is always equal to one, and the number of inputs to the flip-flop circuit FF is equal to two. On the other hand, an arbitrary number of inputs may be given to the logical product circuit AND and logical sum circuit OR. In the present example, however, the number of inputs given to each of the circuits AND and OR is made equal to or is less then three, by way of example. Accordingly, in the case shown in FIG. 1, the output signal M002 which is the logical product of four input signals I/O 001 to I/O 004, is given by obtaining the logical product of two input signals I/O 001 and I/O 002 by the circuit AND 1, and then by obtaining the logical product of three input signals M001, I/O 003 and I/O 004 by the circuit AND 2.

Figure 2:
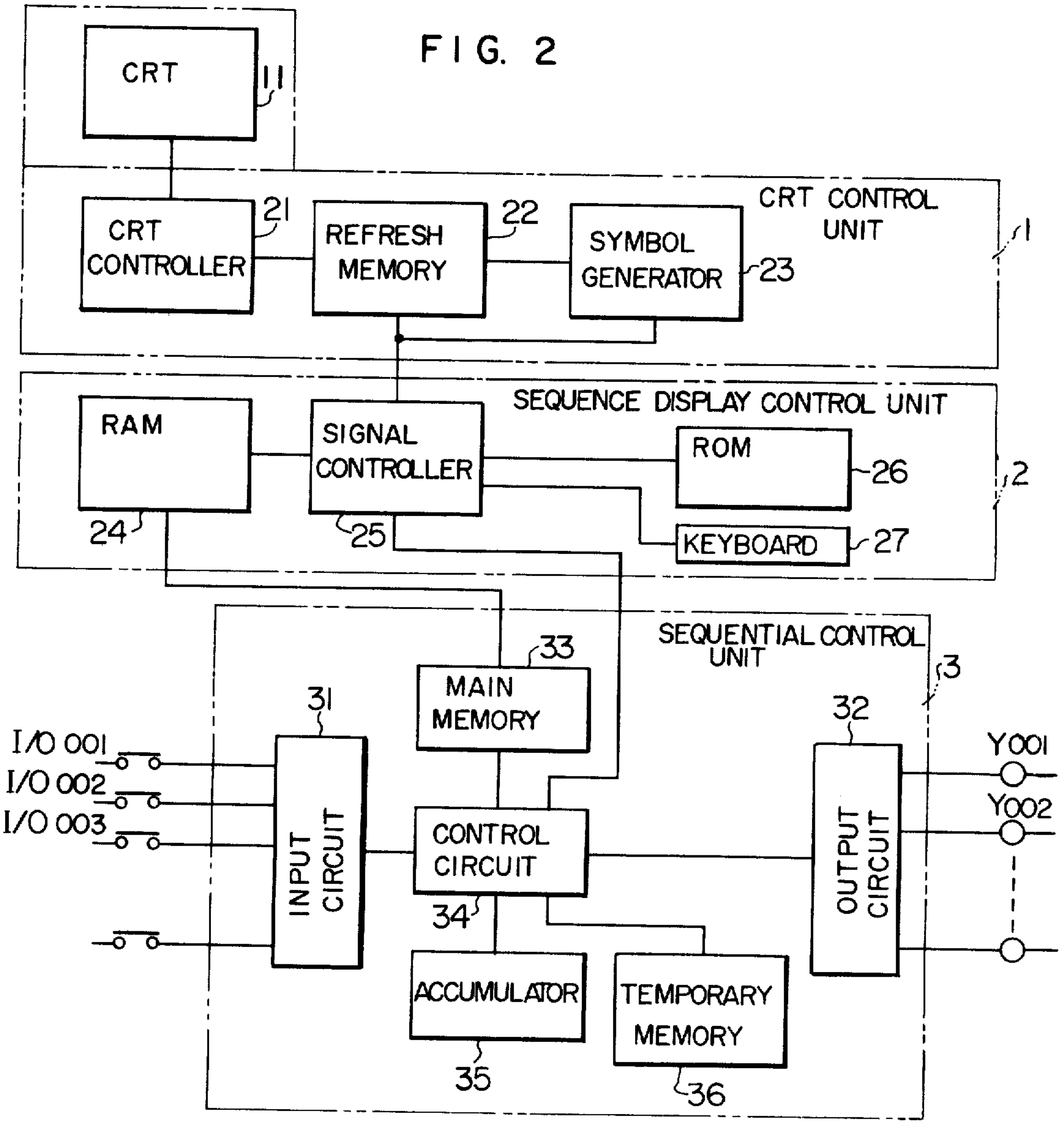
FIG. 2 is a block diagram showing a basic arrangement of a sequence display apparatus according to the present invention which includes a sequential control device, a sequence display control unit and a cathode ray tube control unit.

FIG. 2 is a block diagram showing the whole construction of an embodiment of a display apparatus according to the present invention. Referring to FIG. 2, the embodiment is made up of a sequential control device 3 for conducting the previously-mentioned sequential processing and a sequence display control unit 2 for converting keyed-in inputs into programs to be used in the sequential control device 3 and also for converting these programs into information adapted for display on a CRT 11, and a CRT control unit 1 for displaying this information on the CRT 11 at appropriate positions.

The CRT control unit 1 includes a cathode ray tube control circuit 21, a refresh memory 22 and a symbol generator 23. The sequence display control unit 2 includes a random access memory (RAM) 24, a signal control circuit 25, a read only memory (ROM) 26, and a keyboard 27. The sequential control device 3 includes an input circuit 31, an output circuit 32, a main memory 33, a control circuit 34, an accumulator (ACC) 35, and a temporary memory 36.

Now, explanation will be made of the outline of the sequential control device 3, on which the present invention is based.

Figures 3, 4:
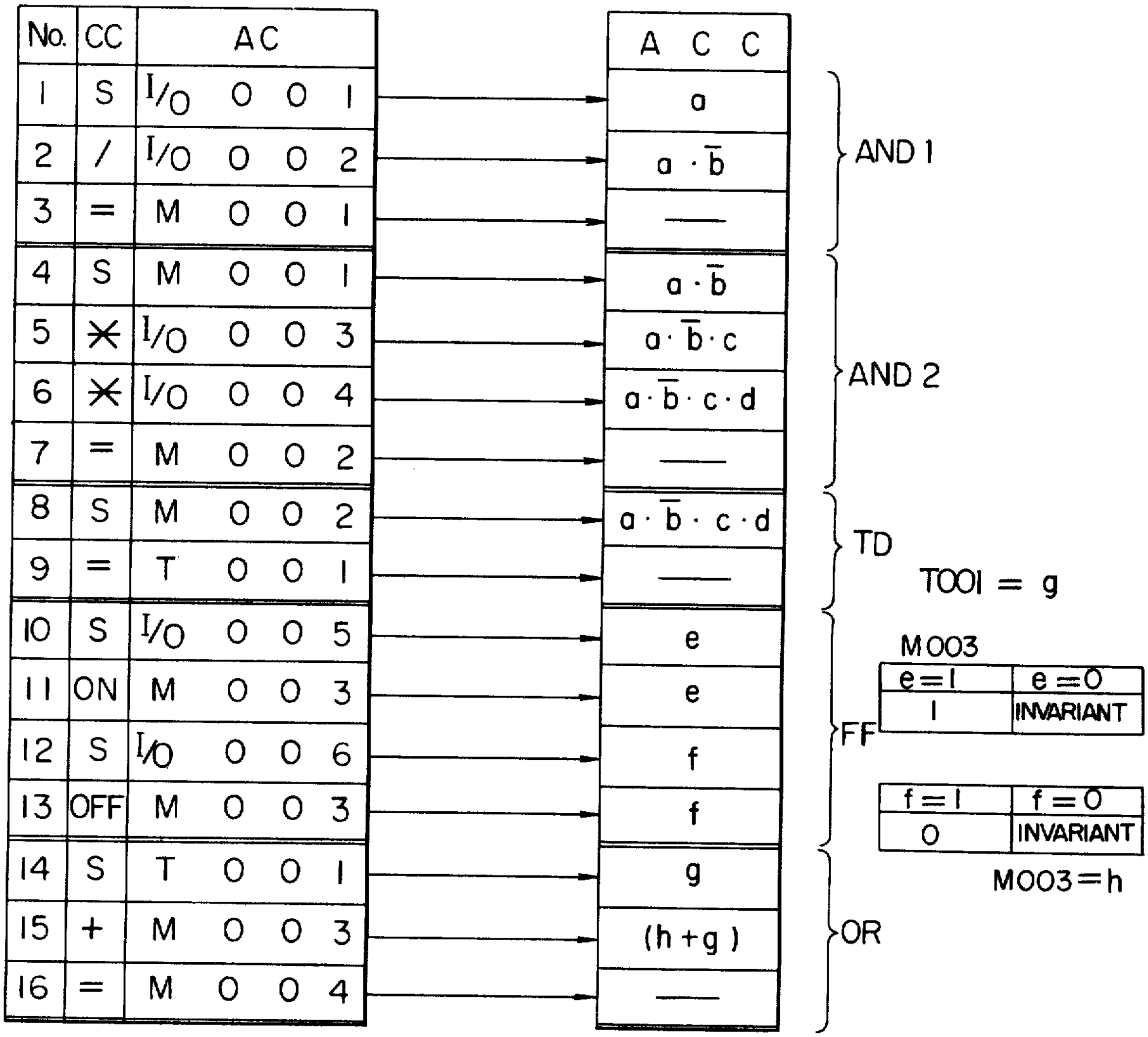
FIG. 3 is a diagram which shows the construction of each program.
FIG. 4 is a diagram which shows a program set having the same function as the logical circuit shown in FIG. 1, and information written in an accumulator at each step of the program set.

The input signals I/O 001 to I/O 006 and other input signals are applied to the input circuit 31, and the output signal from the circuit 31 is subjected to a logical operation in the control circuit 34 in accordance with a sequence program stored in the main memory 33. The result of the logical operation is temporarily stored in the accumulator (ACC) 35, which is a refresh memory. The contents of ACC 35 are outputted to the temporary memory 36 to be stored therein, and also are outputted through the output circuit 32 to output relays Y001, Y002 and so on. The processing in the sequential control device 3 is conducted in such a manner that the sequence program stored in the main memory 33 is read out in a predetermined order at intervals of a predetermined time, and logical operations are performed on the basis of the contents thus read out. The sequence program is a combination of a plurality of programs, each of which is, as shown in FIG. 3, made up of a command code CC and an address code AC. Incidentally, the sequence program for conducting the same processing as the logical operations represented by the logical circuits shown in FIG. 1 is shown in FIG. 4, which will be explained below in detail. The command code CC and address code AC of an actual program are expressed in the form of a combination of logical signals "1" and "0". In the following description, however, these codes CC and AC are expressed by symbols and alpha-numerical characters in order to facilitate the understanding of this subject matter. The above sequence program is executed in the order of the program number. Symbols shown in the command-code column CC of FIG. 4 indicate such processing as shown in FIG. 5. The address n in the "content of processing" in FIG. 5 means the address designated in the address code AC of each program (see FIG. 3).

Next, the processing of the sequence program shown in FIG. 4 will be explained referring to the definition of symbols shown in FIG. 5, to show that the sequence program has the same function as the circuit shown in FIG. 1. In FIG. 4, the lefthand part shows the sequence program and the righthand part shows data entered in the accumulator ACC in each step of the program included in the sequence program. Further, data stored respectively at the addresses I/O 001 to I/O 006 are expressed by a, b, c, d, e and f, respectively. In step 1, the data a stored at the address I/O 001 is read out and entered in the ACC. In step 2, a logical product $a \cdot \bar{b}$ of the data a stored in the ACC and the negation $\bar{b}$ of data b stored at the address I/O 002 is obtained, and entered in the ACC. In step 3, the contents of the ACC, $a \cdot \bar{b}$, are stored at the address M001. A series of processing operations in steps 1 to 3 represents the operation of the logical product circuit AND 1. In step 4, the data $a \cdot \bar{b}$ at the address M001 is transferred to the ACC. In step 5, a logical product $a \cdot \bar{b} \cdot c$ of the data c at the address I/O 003 and the contents $a \cdot \bar{b}$ of the ACC is obtained and entered in the ACC. In step 6, a logical product $a \cdot \bar{b} \cdot c \cdot d$ of the data d at the address I/O 004 and the contents $a \cdot \bar{b} \cdot c$ of the ACC is obtained and entered in the ACC. In step 7, the contents of the ACC are transferred to the address M002. At this time, the contents at the address M002 are equivalent to the output of the logical product circuit AND 2 shown in FIG. 1. In step 8, the contents at the address M002 are transferred to the ACC. In step 9, the contents of the ACC are transferred to the address T001. The memory area for addresses having the symbol "T" is different from an ordinary memory area for storing data only, and is a memory area for a timer connected to an external soft timer (not shown). Accordingly, the signal $a \cdot \bar{b} \cdot c \cdot d$ which has been transferred to the address T001, is immediately applied to the soft timer, the output g of which is stored at the address T001. Although detailed explanation of the soft timer is omitted, when a predetermined time has elapsed after the state of the input signal was changed from "1" to "0" or from "0" to "1", the soft timer delivers an output signal which has a state corresponding to the state of the input signal after the above change. The data, which has been obtained by the combination of the processing in steps 8 and 9 and the action of the soft timer and which is stored in the memory area T001, is equivalent to the output of the timer TD shown in FIG. 1. In step 10, the data e at the address I/O 005 is transferred to the ACC. In step 11, the contents at the address M003 are controlled in accordance with whether the content of the ACC is "1" or "0". That is, when e is "1", the contents of the address M003 are made equal to "1". When e is "0", the contents at the address M003 are left as they are. This corresponds to the fact that the output of the flip-flop circuit FF takes the level "1" only when the input signal having the level "1" is applied to the set input terminal, and is left unchanged when the input signal having the level "0" is applied to the set input terminal. In step 12, the data f at the address I/O 006 is transferred to the ACC. In step 13, the contents at the address M003 are controlled in accordance with whether the contents f of the ACC are "1" or "0". That is, when f is "1", the contents at the address M003 are made equal to "0". When f is "0", the contents at the address M003 are left as they are. This corresponds to the fact that the output of the flip-flop circuit FF takes the level "0" only when the signal having the level "1" is applied to the reset terminal, and is left unchanged when the signal having the level "0" is applied to the reset terminal. A series of processing operations in steps 10 to 13 can realize the function of the flip-flop circuit FF. In step 14, the signal g in the memory area T001 is transferred to the ACC. In step 15, the data h at the address M003 is read out, and a logical sum $(h+g)$ of the data h and the contents g of the ACC is obtained and entered in the ACC. In step 16, the contents of the ACC are transferred to the address M004. The contents at the address M004 are the same as the output of the logical sum circuit OR.

The sequence program shown in the lefthand part of FIG. 4 is stored in the main memory 33 shown in FIG. 2, and conducts the same function as the circuit shown in FIG. 1 in a digital fashion. The above program is formed through the sequence display control unit 2. Also, the sequence display control unit 2 converts this program into information adapted for display on the CRT 11 and registers the converted information in the refresh memory 22. Next, the unit 2 will be explained in more detail. The CRT control unit 1 including the cathode ray tube control circuit 21, the refresh memory 22 and the symbol generator 23 operate in accordance with a well known display technique using a display device such as a cathode ray tube. Since these parts are well known and also do not play an important role in the present invention, and since various conventional units can be employed as these parts 21, 22 and 23 to realize the desired performance a, detailed explanation of these parts is omitted and only a description up to the storing of information in the refresh memory 22 will be made later. The details of the keyboard 27 are illustrated in FIG. 6. Referring to FIG. 6, keys on the keyboard 27 are roughly classified as follows.

I. Mode specifying keys including:

a mode changeover dial $K_1$ for conducting the changeover between the program monitoring/displaying mode and the program composing mode, a "write circuit" key $K_2$ for transferring a program (already composed) from RAM 24 to the main memory 33, a "read circuit" key $K_3$ for transferring the above program from the main memory 33 to RAM 24, and a "compose program" key $K_4$ for indicating the composition of a new program.

II. Modification mode specifying keys including:

an "insert" key for indicating the insertion of a program, a "rewrite" key for indicating the rewriting of a program, a "delete" key for indicating the deletion of a program, and a "batch delete" key for indicating the batch deletion of a program.

III. Logic function specifying keys for specifying one of such logical functions as logical product (AND), logical sum (OR), negation (NOT), a flip-flop function (FF) and time delay (TD).

IV. Address specifying keys for inputting such addresses as T001, M001 and I/O 001 by the key-in operation, including:

a key T for indicating a delayed signal, a key I/O for indicating a signal inputted from the outside, a key M for indicating a signal obtained by a logical operation carried out on the delayed signal, logic output signal and/or external signal, and keys 0 to 9 and A to F for specifying alpha-numerical characters.

V. A set key $K_s$ to be depressed when all of the input and output signals are inputted in each logical processing operation.

VI. Cursor keys for moving a cursor which may be used in editing for indicating a position in the displayed diagram on the surface of the cathode ray tube, including:

a key ▷▷ for moving a cursor in the forward direction by one unit, a key ◁◁ for moving the cursor in the reverse direction by one unit, and a key ▷ for continuously moving the cursor in the forward direction.

Figure 7:
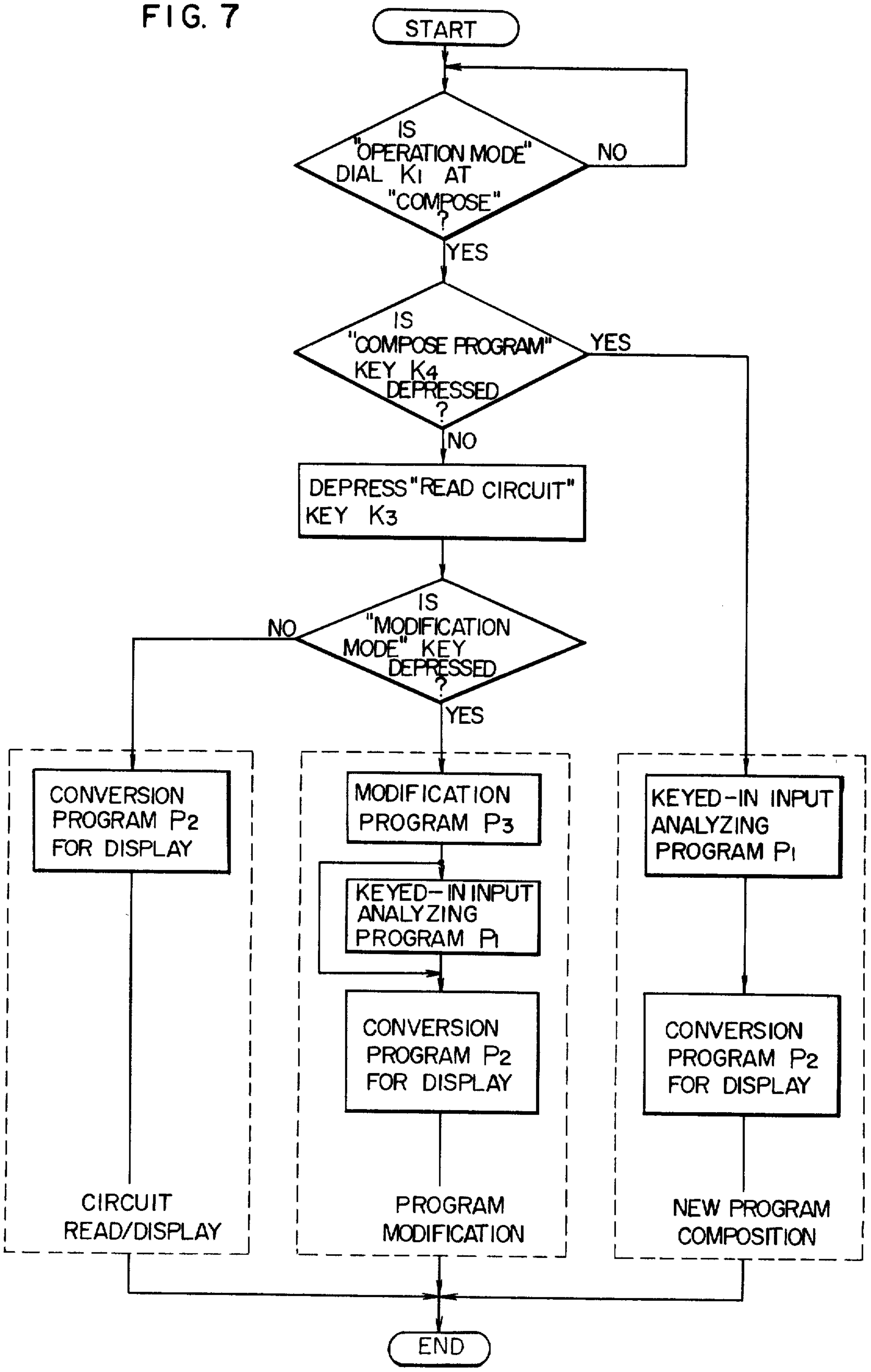
FIG. 7 is a flow chart for explaining programs stored in a read only memory ROM included in the sequence display control device of FIG. 2.

The read only memory (ROM) 26 shown in FIG. 2 stores therein programs operations for executing various processing. The control circuit 25 gives signals for successively reading programs stored in the ROM 26, analyzes the programs and generates signals for shifting various information and/or inputs in accordance with the results of the analysis. In the following, various signals generated from the control circuit 25 are not described, but only the contents of the resultant operations will be described. In other words, the contents of programs stored in the ROM 26 of the sequence display control unit 2, which are to be carried out with the help of the control circuit 25, will be described. When viewed from the standpoint of the processing function, the contents of the ROM 26 may be, as shown in FIG. 7, divided into a new program composing function, a circuit reading/displaying function, and a program modifying function. The new program composing function is conducted by a keyed-in input analyzing program $P_1$ and a conversion program $P_2$ for obtaining display signals, and is executed when the mode changeover dial $K_1$ is set to the position "COMPOSE" and the program composing key $K_4$ is depressed. The circit reading/displaying function is conducted by the conversion program $P_2$, and is executed when the mode changeover dial $K_1$ is set to the position "COMPOSE" and the circuit read-out key $K_3$ is depressed. The program modifying function is conducted by a modification program $P_3$, the keyed-in input analyzing program $P_1$ and the conversion program $P_2$, and is executed when the mode changeover dial $K_1$ is set to the position "COMPOSE", the circuit read-out key $K_3$ is depressed, and any one of the insertion, rewriting, deletion, and batch deletion keys is depressed.

Figure 9:
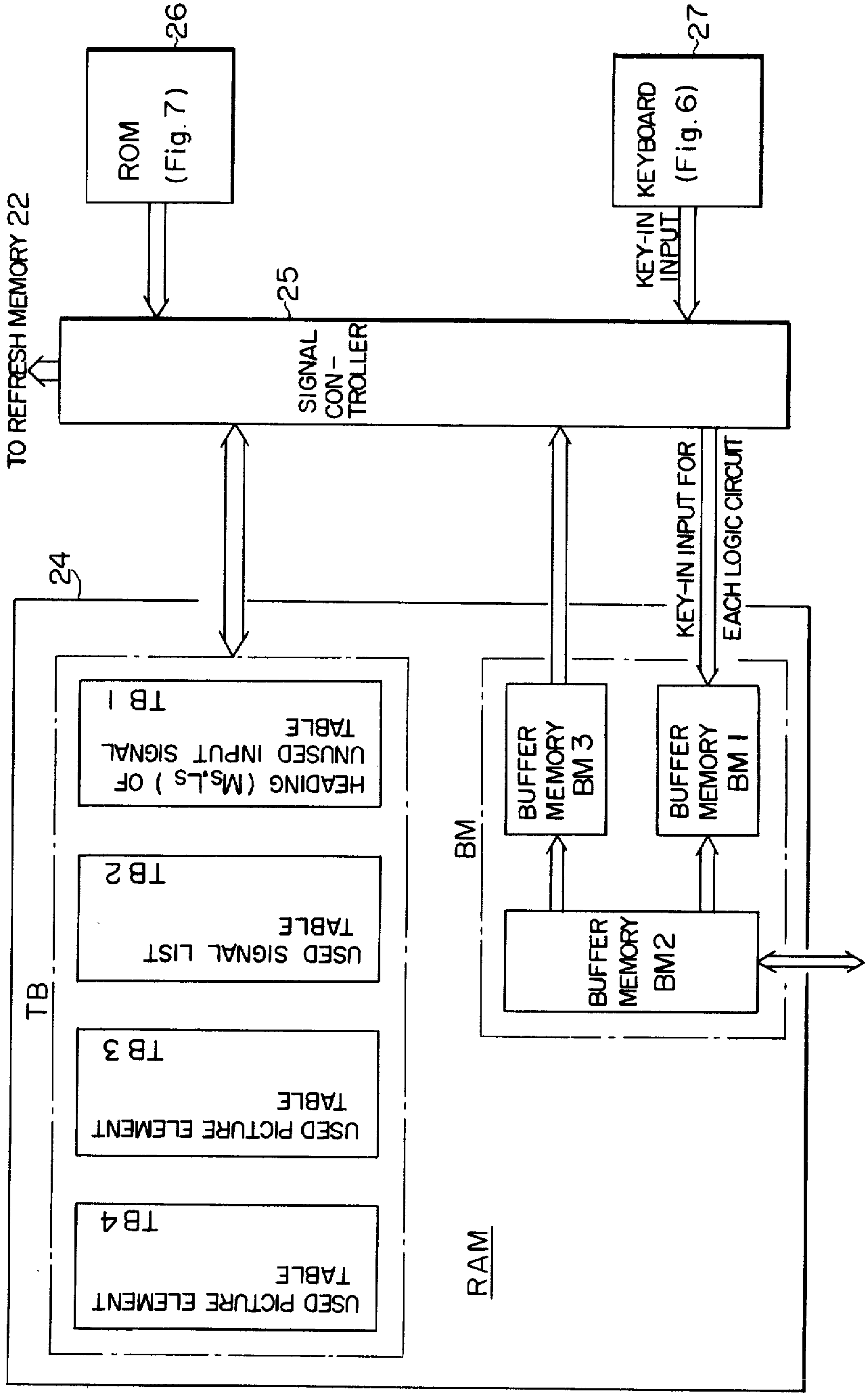
FIG. 9 is a schematic diagram of a random access memory RAM included in the sequence display control device of FIG. 2, and including various areas in accordance with the kind of information stored therein.

The random access memory (RAM) 24 shown in FIG. 2 stores therein information inputted by the keyboard, information obtained by logical operations in the control circuit 25, and information to be transferred to the refresh memory 22 and to the main memory 33. Since each of the above information has to be stored in a form suited to processing, RAM 24 has a plurality of memory areas each for storing one of the above information. Though a method of storing information in each of the memory areas will be explained later in detail, the outline of RAM 24 will be explained below with reference to FIG. 9. Referring to FIG. 9, a buffer memory BM is made up of buffer memories BM1, BM2 and BM3. The buffer memory BM1 stores therein a keyed-in input which is sent from the keyboard 27 through the control circuit 25 and corresponds to one logical circuit unit. The contents stored in the buffer memory BM1 are converted by the keyed-in input analyzing program $P_1$ into a program having the same function as the above logical circuit. The buffer memory BM2 receives the contents stored in the main memory 33 when the circuit read-out key $K_3$ on the keyboard 27 is depressed, and the contents stored in the buffer memory BM2 are transferred to the main memory 33 when the circuit write-in key $K_2$ is depressed. Further, the buffer memory BM2 stores therein the program composed in the buffer memory BM1, and has a memory capacity large enough to store the sequence program shown in the lefthand part of FIG. 4. The buffer memory BM3 receives and stores only that part of the sequence program stored in the buffer memory BM2 which corresponds to one logical circuit unit. The contents of the buffer memory BM3 are converted by the conversion program $P_2$ into information similar to the input information from the keyboard 27. The information obtained by the above conversion is used to determine a position (on the display surface of the cathode ray tube) for displaying a symbol. In addition, various information stored in a table TB is used to determine the above-mentioned position. The table TB includes a heading position of unused input signals table TB1, a used signal listing table TB2, state-of-picture elements tables TB3 and TB4, and others.

Figures 8A, 8B, 8C, 8D:
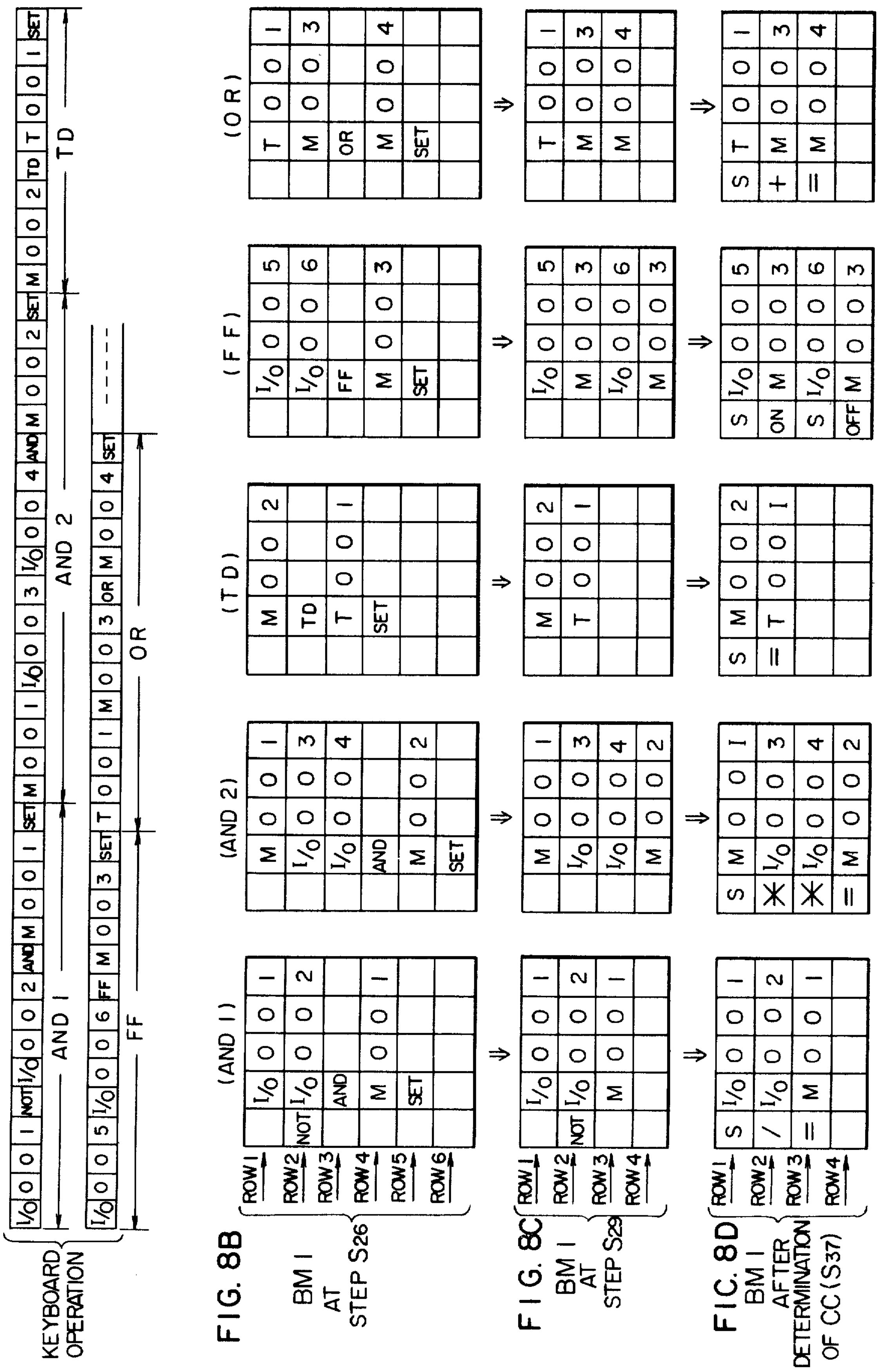
FIGS. 8A to 8D are diagrams which show steps of composing programs by the keyed-in input analyzing program $P_1$ shown in FIG. 7.
Figure 10:
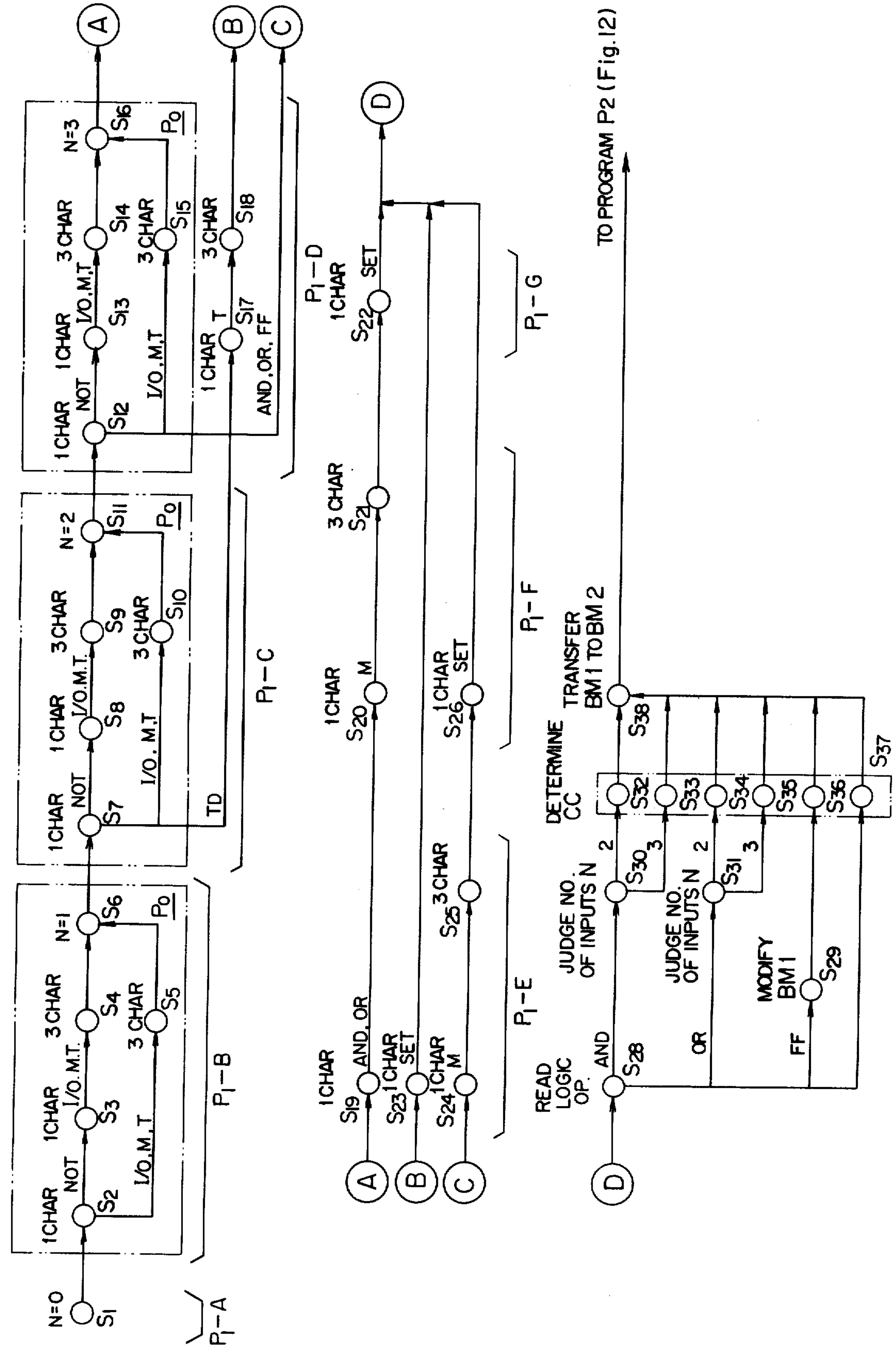
FIG. 10 is a state transition diagram for illustrating the function of the keyed-in input analyzing program $P_1$.

Now, explanation will be made of the operation of the sequence display control device 2 which includes the above-mentioned units 21 to 27. At first, the new program composing function shown in FIG. 7 will be explained. FIG. 10 is a state transition diagram for showing the processing conducted by the keyed-in input analyzing program $P_1$. The keyed-in input, which is inputted and analyzed by the program $P_1$, is stored in the buffer memory BM1 included in RAM 24. FIGS. 8A to 8D show information which is stored in the buffer memory BM1 by operating the keyboard 27. FIG. 8A shows the key operation at the keyboard 27 for obtaining the final output of the circuit shown in FIG. 1, and FIGS. 8B to 8D show the contents of the buffer memory BM1 in various steps. As is apparent from the keyboard operating procedure shown in FIG. 8A, information is inputted by each logical circuit unit. That is, all of the names of the input signals given to a logical circuit are first inputted, the kind of logical function is then inputted, and then the name of the output signal is inputted. Finally, the set key $K_s$ is depressed to complete one logical operation unit. As described above, it is a main feature of this logic symbol display system to input, at all times, all the names of the input and output signals and the kind of logical function. Incidentally, in the ladder display system, the name of the output signal is specified only when the output signal forms an external output. Since only the above-mentioned inputting operation is required for modifying the sequence control in accordance with the present invention, even an operator who lacks a specific knowledge of computers can readily make logical designs. However, it is assumed that the above-mentioned information is inputted, taking the following items into consideration. An error message may be displayed when these items are not satisfied.

(a) The name of the input signal and that of the output signal have at the top thereof a symbol "I/O", "M", or "T" and subsequently have a three-digit numeral. Accordingly, each of the input and output signals is a four-digit signal.

(b) When a negation signal is inputted, a symbol "NOT" is added before the four-digit input signal. Only in this case is the five-digit signal employed. The negation of the output signal is never employed.

(c) Only one input is given to a timer, and two inputs are given to a flip-flop circuit. Two or three inputs are allowed to an AND circuit or an OR circuit, though still more inputs can be employed theoretically.

(d) The name of the output signal from a logical circuit is indicated by the symbol "M" or "T". The symbol "T" is allowed to be used only to indicate the output signal from a timer. The symbol "M" indicates a signal obtained by a logical operation, and the symbol "I/O" indicates an input signal from the outside.

(e) The name of the input signal and that of the output signal must be specified at each logical function.

When input information is correctly inputted by satisfying the above-mentioned items, a set of information bounded by a symbol "SET" is stored in the buffer memory BM1, as shown in FIG. 8B. In more detail, referring to FIG. 8B, the inputted information is stored in the buffer memory BM1 in such a manner that a four-digit signal having at the top thereof the symbol "I/O", "M", or "T", a five-digit signal having at the top thereof the signal "NOT", and a signal indicating one of the logical functions AND, OR, TD and FF are each used as one unit and stored in one row. The above-mentioned processing for storing the inputted information in the buffer memory BM1 is conducted in steps $S_1$ to $S_{26}$ shown in FIG. 10.

The processing in each step of the keyed-in input analyzing program $P_1$ shown in FIG. 10 is as follows:

In part $P_1$-A including a step $S_1$: A counter for counting the number of input signals given to a logical circuit is reset, that is, the output N of the counter is made equal to zero.

In part $P_1$-B including steps $S_2$ to $S_6$: A first input, that is, an input signal to be stored in the first row (shown in FIG. 8B) of the buffer memory BM1 is checked and stored in the buffer memory BM1. In more detail, in step $S_2$, a first character is inputted and transferred to the buffer memory BM1. If the first character is "NOT", the processing in step $S_3$ is next conducted, otherwise, the processing in step $S_5$ is conducted. In step $S_3$, a next character is inputted by a key-in operation. After it has been checked that the next character is one of "T", "M" and "I/O", the next character is transferred to the buffer memory BM1. In step $S_4$, after it has been checked that an inputted three-character signal is made up of three alpha-numerical characters selected from characters which can be inputted by the address specifying keys 0 to 9 and A to F, the three-character signal is transferred to the buffer memory BM1. If the character inputted in step $S_2$ differs from "NOT", the character will be one of "M", "T" and "I/O". In step $S_5$, a three-character signal is inputted, and is transferred to the buffer memory BM1 after it has been checked that the signal is made up of three alpha-numerical characters. The four or five characters inputted in steps $S_2$ to $S_5$ are stored in the first row of the buffer memory BM1. After the processing in step $S_4$ or $S_5$ has been completed, an operation for obtaining $N=N+1$ is preformed in step $S_6$.

In part $P_1$-C including steps $S_7$ to $S_{11}$: A second input to be entered in the second row of the buffer memory BM1 is checked and then stored in the buffer memory BM1. In more detail, the processing in the part $P_1$-C is fundamentally the same as the processing $P_0$ in the part $P_1$-B, and therefore the steps $S_7$ to $S_{11}$ corresponding to the steps $S_2$ to $S_6$ form an input signal having at the top thereof a symbol "I/O", "M", "T", or "NOT". In the case where a delaying operation is performed, however, only one input signal is employed and therefore the second input is a character "TD" indicating the delaying function. When the character inputted in step $S_7$ is "TD", the key-in operation of the second input terminates, and the processing in step $S_{17}$ is next conducted. Though the operation for obtaining $N=N+1$ is performed in step $S_{11}$, the count N is left unchanged in the case where the character "TD" is inputted. The count N indicates the number of input signals given to a logical circuit.

In part $P_1$-D including steps $S_{12}$ to $S_{18}$: A third input to be entered in the third row of the buffer memory BM1 is checked and then stored in the buffer memory BM1. An input signal having at the top thereof the character "I/O", "M", "T", or "NOT" is inputted by conducting the same processing $P_0$ as in the part $P_1$-B. The third input inputted in steps $S_{12}$ to $S_{18}$ is always entered in the third row of the buffer memory BM1. When the character inputted in step $S_{12}$ is a symbol "AND" or "OR", the key-in operation of the third input terminates, and the processing in step 24 is next conducted. In the case where the symbol "TD" has been inputted in step $S_7$, the processing in step $S_{17}$ is conducted. In step $S_{17}$, one character is inputted, and is stored in the buffer memory BM1 after it has been checked that the character is "T". In step $S_{18}$, a three-character signal is inputted, and is entered in the buffer memory BM1 after it has been checked that the signal is made up of three alpha-numerical characters.

In part $P_1$-E including steps $S_{19}$ and $S_{23}$ to $S_{25}$: A fourth input to be entered in the fourth row of the buffer memory BM1 is checked and stored.

As can be understood from the foregoing explanation and the contents of buffer memory BM1 shown in FIG. 8B, the processing $P_0$ shown in FIG. 10 is to enter an input signal (having at the top thereof a symbol "I/O", "M", "T", or "NOT") of a logical circuit in the buffer memory BM1. Accordingly, in the case where only one input signal is employed as in a delaying circuit, the fourth input is "SET". That is, in step $S_{23}$, one character is inputted, and it is determined that the character is "SET". Thus, one logical operation unit terminates. In the case where two input signals are inputted as in a two-input flip-flop circuit, two-input AND circuit and two-input OR circuit, the processing $P_0$ is twice conducted, and then the processing in step $S_{24}$ is conducted.

In this case, the fourth input is the output signal of a logical circuit. Accordingly, in step $S_{24}$, one character is inputted, and is entered in the fourth row of the buffer memory BM1 after it has been checked that the character is "M". In step $S_{25}$, a three-character signal is inputted, and is entered in the fourth row of the buffer memory BM1 after it has been checked that the signal is made up of three alpha-numerical characters.

In part $P_1$-F including steps $S_{20}$, $S_{21}$ and $S_{26}$: A fifth input to be entered in the fifth row of the buffer memory BM1 is checked and then stored. For a two-input logical circuit, in step $S_{26}$, one character is inputted, and is entered in the fifth row of the buffer memory BM1 after it has been determined that the character is "SET". For a three-input logical circuit, in step $S_{20}$, one character "M" is inputted, and is entered in the fifth row of the buffer memory BM1 after it has been determined that the character is "M". Further, in step $S_{21}$, a three-character signal is inputted, and is entered in the fifth row of the buffer memory BM1 after it has been determined that the signal is made up of three alpha-numerical characters.

In part $P_1$-G including a step $S_{22}$: A sixth input to be entered in the sixth row of the buffer memory BM1 is checked and then stored. That is, in step $S_{22}$, a character "SET" is inputted, and is entered in the sixth row of the buffer memory BM1 after it has been determined that the inputted character is "SET".

As has been described above, in step $S_2$, $S_7$, $S_{12}$, $S_{17}$, $S_{19}$, $S_{23}$, $S_{24}$, $S_{20}$, $S_{26}$ and $S_{22}$, one character is inputted in such a manner that the character is placed at a new row of the buffer memory BM1. Accordingly, the inputted information is stored in the buffer memory BM1 in accordance with the name of the input signal, the kind of logical operation, the name of output signal, and other categories.

When the series of processing operations in steps $S_1$ to $S_{26}$ has been completed, information concerning the input and output of one logical circuit unit is stored in the buffer memory BM1. Each of five logical circuits shown in FIG. 1 is stored in the buffer memory BM1 in a manner as shown in FIG. 8B.

Figures 11, 15A, 15B, 15C, 15D:
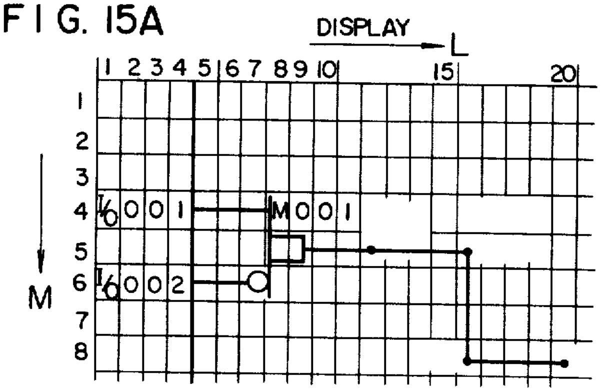
FIG. 11 is a diagram which illustrates, in a table, how command codes are determined in the steps $S_{32}$ to $S_{37}$ shown in FIG. 10.
FIGS. 15A to 15D are diagrams which show an example of display patterns on the display surface of cathode ray tube and the contents stored in each of the tables $TB_2$, $TB_3$ and $TB_4$ included in the RAM of FIG. 9.

Next, in steps $S_{28}$ to $S_{38}$, the contents of the buffer memory BM1 shown in FIG. 8B are converted into a program which can be stored and used in the main memory 33 (shown in FIG. 2). In more detail, in step $S_{28}$, the kind of logical functions such as "AND", "OR", "FF" and "TD" is read out of the buffer memory BM1, other information than the names of the input and output signals, that is, such a symbol as "AND", "OR", "FF", "TD" and "SET" is removed from the buffer memory BM1, and then the names of the input and output signals are placed in succeeding rows. For a flip-flop circuit, however, in step $S_{29}$, the name of the first input signal, the name of the output signal, the name of second input signal and the name of the output signal are stored, in the order described, in four rows of the buffer memory BM1. FIG. 8C shows the contents stored in the buffer memory BM1 when the processing in steps $S_{28}$ and $S_{29}$ has been completed. In step $S_{30}$ or $S_{31}$, the number of input signals given to an AND or OR circuit is judged from the count N of the previously-mentioned counter. In steps $S_{32}$ to $S_{37}$, command codes are entered in the buffer memory BM1, taking into consideration whether the symbol "NOT" is present or not. Various combinations of command codes are determined on the basis of the kind of logical operation and the number of input signals, as shown in FIG. 11. Referring to FIG. 11, a combination "S, *, =" of command codes is employed for a two-input AND circuit. Further, combinations "S, *, *, =", "S, +, =", "S, +, +, =", "S, ON, S, OFF", and "S, =" are employed for a three-input AND circuit, two-input OR circuit, three-input OR circuit, flip-flop circuit, and delaying circuit, respectively. The negation of first input is obtained by changing the first "S" to "$". The negation of the second input is obtained by changing "*" to "/" in an AND circuit, by changing "+" to "−" in an OR circuit, and by changing the second "S" to "$" in a flip-flop circuit. FIG. 8D shows the contents stored in the buffer memory BM1 when the combination of the command codes has been entered. In step $S_{38}$, the above-mentioned contents stored in the buffer memory BM1 are transferred to the buffer memory BM2 shown in FIG. 9. The buffer memory BM1 has a memory capacity corresponding to only one logical circuit unit. On the other hand, the buffer memory BM2 has a large memory capacity comparable to the memory capacity of the main memory 33 (shown in FIG. 2). When the processing in step $S_{38}$ has been completed, the key-in input analyzing program $P_1$ shown in FIG. 7 terminates.

Next, explanation will be made of the conversion program $P_2$ for obtaining display signals, with reference to FIG. 12. In the new program composing function shown in FIG. 7, the conversion program $P_2$ is executed immediately after the program $P_1$. The explanation of the conversion program $P_2$ may not be readily understood unless the manner of displaying a logic circuit diagram on the display surface of the cathode ray tube is made clear. Therefore, the manner of display on the display surface of the cathode ray tube will be first explained, with reference to FIG. 13.

In a cathode ray tube display device, as is well known, one picture element is formed of $m \times n$ dots to display one character or symbol. The display surface of the cathode ray tube is divided into 24 parts in the vertical direction M and into 80 parts in the horizontal direction L to form 1,920 picture elements in total, by way of example. In accordance with the present invention, the display surface of the cathode ray tube is divided into three regions X, Y and Z which display different kinds of information. In the region X, information inputted from the keyboard is displayed by alpha-numerical characters and others. For example, when the information is inputted in the order shown in FIG. 8A, a pattern "I/O 001NOT I/O 002AND M001SET . . . " is displayed in the region X. That is, symbolic display for the logical operations such as "AND", "OR", "FF" and "TD" are not employed in the region X. The region Y displays one logic symbol and the names of the input and output signals associated therewith. The region Z is the most important in the display, and a plurality of logic symbols (that is, a logical circuit diagram such as shown in FIG. 1) are arranged appropriately in the region Z. One character or the like is displayed in each of the regions X and Y each time a key-in operation is performed. In other words, each of the character inputting steps shown in FIG. 10 is followed by a display step for displaying a character in the regions X and Y, though the display step is omitted in FIG. 10. On the other hand, each of the logical circuits is displayed in the region Z, by executing the conversion program $P_2$ after the processing in all of the steps shown in FIG. 10 has been completed. FIG. 14 shows the key-in process and the display pattern in each of the regions Z and Y, in the case where the above-mentioned display control is conducted. The display pattern in the region X is omitted in FIG. 14, since alpha-numerical characters similar to the key-in operation are merely arranged in the transverse direction L each time a key-in operation is performed. Referring to FIG. 14, when one logical symbol and the names of input and output signals associated therewith have been displayed in the region Y, the logic circuit unit is transferred to the region Z, taking the appropriateness of the display location into consideration. In the regions X and Y, it is not required to take into consideration the appropriateness of the display location of the logical symbol and the names of input and output signals associated therewith, for the following reasons. For example, let us consider the case where information is inputted in the order shown in FIG. 8A. In the region X, the first input "I/O" is displayed on a picture element having a coordinate (M=2, L=1), and subsequent inputs are displayed on picture elements having coordinates (M=2, L=2,3,4, . . . ) obtained by fixing the value of M and by increasing the value of L. In the region Y, the first input signal I/O 001 is displayed on picture elements having coordinates (M=1, L=71, 72, 73 and 74), and the second input signal I/O 002 is displayed on picture elements having coordinates (M=2, L=71, 72, 73 and 74). That is, the position of each input signal is fixed in the region Y. On the other hand, in the region Z, the first logic symbol (AND 1) is displayed at a fixed position but the second logic symbol (AND 2) and others may be displayed at various positions.

Figure 13:
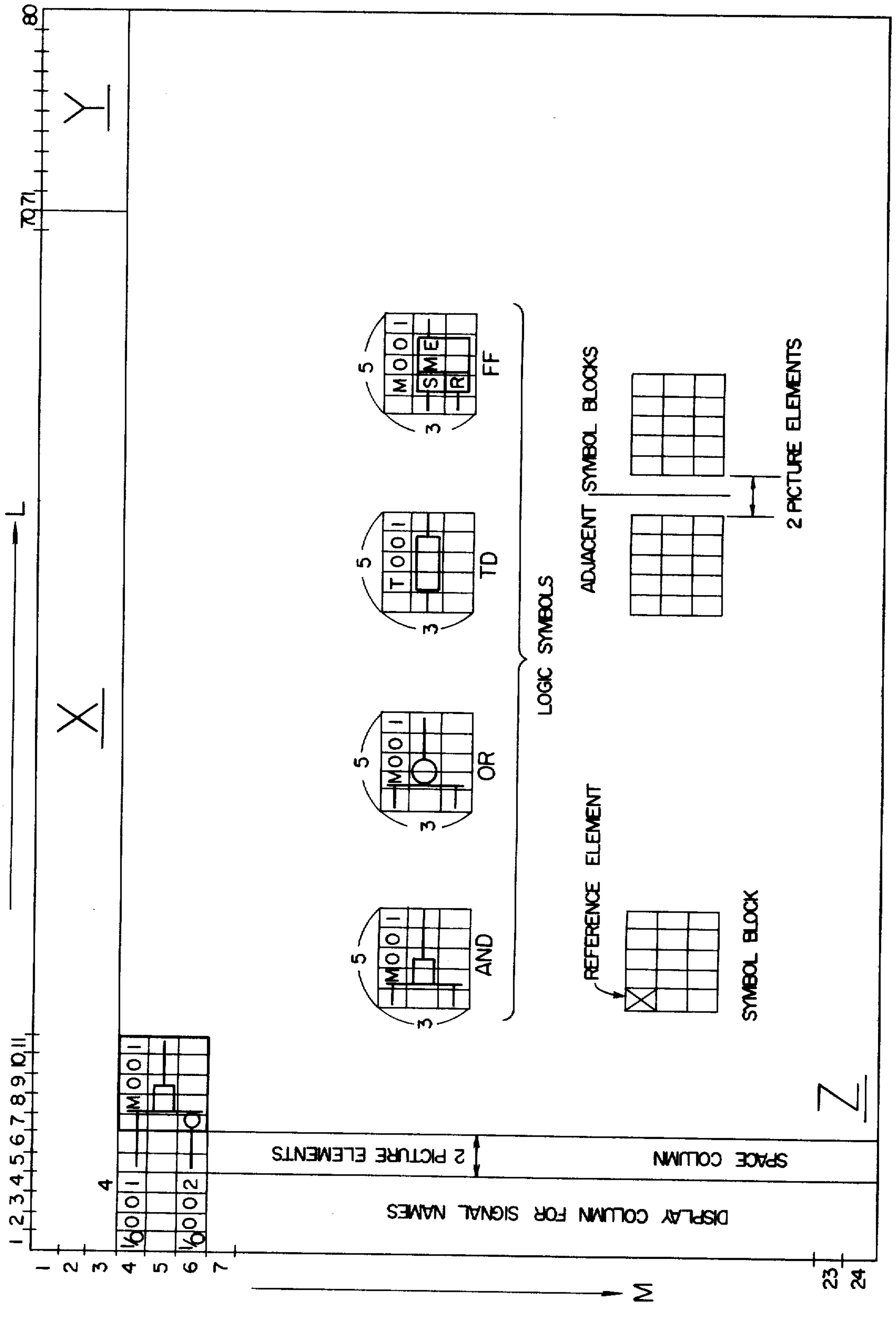
FIG. 13 is a diagram which shows a display surface of cathode ray tube including respective display regions.

The display rule in the region Z will be explained below in more detail. Referring to FIG. 13, four columns having coordinates (L=1, 2, 3 and 4) are used to display the name of a signal, and two columns having coordinates (L=5 and 6) form a space. One logic symbol having input and output signal lines is displayed on 5 (in the L-direction)×3(in the M-direction) picture elements, namely, on 15 picture elements. The logic symbols AND, OR, FF and TD are displayed on 15 picture elements in a manner as shown in FIG. 13. That is, all of the logic symbols can be displayed on 5×3 picture elements together with the name of the output signal. Accordingly, when the position of any one of 15 picture elements, which form a symbol block, is determined, the position of the logic symbol is determined. One picture element in the upper left corner of a symbol block is used as the reference picture element of the symbol block. Incidentally, a spacing having two picture elements in the L-direction is provided between adjacent symbol blocks, and between a signal name displaying column and a symbol block.

Since logic symbols are arranged in accordance with the above-mentioned display rule, the first logic symbol (corresponding to "AND 1" shown in FIG. 1) is displayed on 33 picture elements having coordinates (M=4, 5 and 6, L=1, 2, . . . , 10 and 11), together with the names of input and output signals. That is, the display position of the first logic symbol is fixed, and the arrangement of the second and subsequent logic symbols is a very important problem.

Now, explanation will be made of the conversion program $P_2$ for obtaining display signals, on the assumption that the display surface of the cathode ray tube is used in accordance with the above-mentioned rule. Referring to FIG. 12, in step $s_{40}$, a program corresponding to one logical circuit is transferred from the buffer memory BM2 (shown in FIG. 9) to the buffer memory BM3. In general, the program unit corresponding to one logical circuit starts from a command code "S" or "$" and terminates at an instruction code "=". Therefore, a program unit can be taken out of the buffer memory BM2 by taking consideration of this fact. A program unit corresponding to one flip-flop circuit is taken out on the basis of a combination of command codes "S, ON, S, OFF". The program unit which is entered in the buffer memory BM3 in the above-mentioned manner, is the same as the program shown in FIG. 8D. As is apparent from the state diagram shown in FIG. 10, when the conversion program $P_2$ is executed, a program to be converted is always prepared in the buffer memory BM2 (shown in FIG. 9). In the new program composing function or program modifying function shown in FIG. 7, the processing in the program $P_1$ has been conducted before the conversion program $P_2$ is executed, and the program converted in the buffer memory BM1 has been stored in the buffer memory BM2. In the circuit reading/displaying function, since the circuit read-out key $K_3$ has been depressed, the program stored in the main memory 33 (which is included in the sequential control device 3) has been transferred to the buffer memory BM2. In step $S_{41}$, the kind of logical operation is judged on the basis of the combinations of command codes shown in FIG. 11. In steps $S_{42}$ or $S_{43}$, the number of input signals in a logical product operation or logical sum operation is detected on the basis of the number of command codes in each of the combinations of command codes shown in FIG. 11. In step $S_{44}$, the name of the output signal is checked. In step $S_{45}$, the name of the input signal including the negation information is checked. That is, when the processing in steps $S_{40}$ to $S_{45}$ has been completed, the buffer memory BM3 stores therein the following four kinds of information separately: (1) the kind of logical operation, (2) the number of input signals, (3) the name of the output signal, and (4) the name of the input signal including also the negation notation.

By utilizing the above-mentioned information, a logical circuit is displayed in an optimized configuration as illustrated in steps $S_{46}$ to $S_{72}$. In step $S_{46}$, it is determined whether the logical circuit to be displayed is a first one or not, that is, it is checked whether any logical circuit has been displayed in the region Z of the the display surface of cathode ray tube or not. In the case where no logical circuit is displayed in the region Z, the number of inputs is checked in step $S_{47}$, and the position for displaying the name of the input signal is determined in each of the steps $S_{48}$ to $S_{50}$. In more detail, a group of picture elements having coordinates (M=5, L=1 to 4), a group of picture elements having coordinates (M=4 and 6, L=1 to 4), and a group of picture elements having coordinates (M=4 to 6, L=1 to 4) form the signal name displaying area, for one input, two inputs, and three inputs, respectively. In step $S_{51}$, it is determined that a logic symbol corresponding to the logical operation is displayed on 15 picture elements having coordinates (M=4 to 6, L=7 to 11). Further, a straight line for connecting the name of the input signal directly to the input signal line in the symbol block is displayed in a space column shown in FIG. 13. Information determined in steps $S_{48}$ to $S_{51}$ (that is, information on the display position) is successively sent to the refresh memory 22 or symbol generator 23 to display the name of the output signal and the logic symbol on the display surface of cathode ray tube. Simultaneously with the processing in steps $S_{48}$ to $S_{51}$, the state of the display is set or stored in each of the tables included in RAM 24

(shown in FIG. 9). In more detail, a coordinate ($M_s=7$, $L_s=5$) is set in the heading of the unused input signal ($M_s$, $L_s$) table TB1. The name of each of the input and output signals, and the start, end and turn points of each signal are stored in the used signal listing table TB2. Further, it is stored in the used picture element tables TB3 and TB4 whether each picture element has thereon any display pattern or not. In the table TB3, however, picture elements only displaying a straight line extended in the L-direction are considered to be unused. In the table TB4, picture elements only displaying a straight line extended in the M-direction are considered to be unused. Such treatment in the tables TB3 and TB4 enables cross connections. FIG. 15A shows an example of a display and FIGS. 15B to 15D show the contents stored in these tables for the display of FIG. 15A to help provide an understanding of these tables. That is, FIG. 15A shows the logical circuit displayed on the display surface, and FIGS. 15B, 15C and 15D show the contents stored in the table TB2, those stored in the table TB3, and those stored in the table TB4, respectively. In this example, as shown in FIG. 15A, an output signal line M001 is extended horizontally to a picture element ($M=5$, $L=16$), then turned and extended to a picture element ($M=8$, $L=16$), and further turned and extended to a picture element ($M=8$, $L=20$). In this case, as shown in FIG. 15B, the table TB2 stores therein the fact that the start point and end point of an input signal line concerning the input signal I/O 001 are given by picture elements ($M=4$, $L=5$) and ($M=4$, $L=6$), respectively, and this input signal line has no turn point. The start and end points of an input signal line concerning the input signal I/O 002 are given by picture elements ($M=6$, $L=5$) and ($M=6$, $L=6$), respectively and, this input signal line has no turn point. The starting point, end point and two turn points of the output signal line concerning the output M001 are given by picture elements ($M=5$, $L=12$), ($M=8$, $L=20$), ($M=5$, $L=16$) and ($M=8$, $L=16$), respectively. A picture element adjacent to the output line included in a symbol block (formed of 15 picture elements) is used as the start point of the output signal line. Each of the tables TB3 and TB4 stores therein the state of the display in the region Z (shown in FIG. 13). In the example shown in FIG. 15A, since no signal connection is made in the signal name display column, the state of the display in this column is not stored in the tables TB3 and TB4. As a rule for the memory in the tables TB3 and TB4, an area corresponding to $3\times5$ picture elements forming the symbol block takes the state "1" unconditionally. Further, in the table TB3 which neglects the horizontal line, an area corresponding to picture elements indicating a straight line extended in the L-direction is arranged to take the state "0". Thus, an area corresponding to only four picture elements ($L=16$, $M=5$ to 8) takes the state "1", and an area corresponding to other picture elements takes the state "0". On the other hand, in the table TB4 which neglects the vertical line, an area corresponding to picture elements ($L=16$, $M=6$ and 7) takes the state "0". Since the tables TB3 and TB4 store a display pattern under the above-mentioned provisions, if a picture element takes the state "1" in both of the tables TB3 and TB4, it is impossible to display a new pattern on the picture element. If the picture element takes the state of "0" in both tables TB3 and TB4, any pattern may be displayed on the picture element. Further, if the element takes the state "1" only in one of the tables TB3 and TB4, it is possible to display a straight line extended in the allowed direction, on the basis of the above-mentioned rule. Accordingly, cross connections can be displayed, and therefore it becomes possible to use the display surface of the cathode ray tube with a high efficiency.

Figure 12:
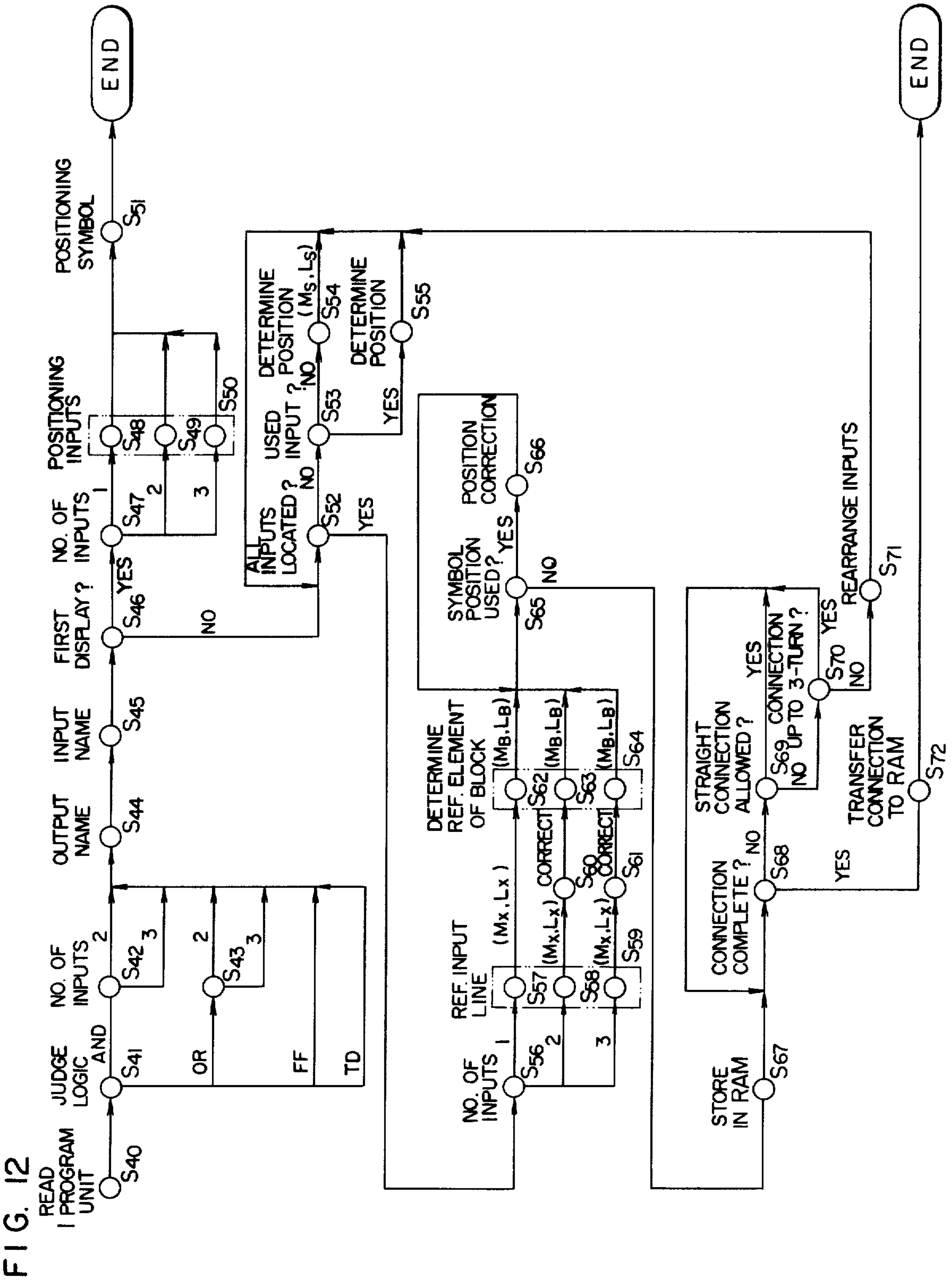
FIG. 12 is a state transition diagram for illustrating the function of the conversion program $P_2$ (for obtaining display signals) shown in FIG. 7.

When the processing in step $S_{51}$ (shown in FIG. 12) has been completed, the processing for one logical circuit terminates, and then information for a new logical circuit is processed in step $S_1$ (shown in FIG. 10) or $S_{40}$ (shown in FIG. 12).

The processing in steps $S_{47}$ to $S_{51}$ corresponds to the case where no logical circuit has been displayed in the region Z, and can be readily conducted since the display positions have been already determined by rule. On the other hand, when it is judged that any logical circuit has been displayed in the region Z, it is required to appropriately arrange a next logical circuit to be displayed. Now, the arrangement procedure in a step $S_{52}$ and subsequent steps will be explained below in detail. FIGS. 16A to 16I show the contents which have been displayed on the display surface of the cathode ray tube before the processing in step $S_{52}$ is conducted. In the following explanation, it will be shown how a display pattern is varied by the arrangement processing in various cases.

In steps $S_{52}$ to $S_{55}$, the position for diplaying the name of the input signal is determined. FIGS. 17A to 17I show the state of the display surface after the name of each input signal has been displayed, in order to assist the following explanation in each case. In step $S_{53}$, it is checked whether the input signal name has been used or not. The term "used input signal" means the name of the input signal which has been displayed on the display surface. The above processing can be conducted by checking the used signal listing table TB2. When none of the names of the input signals have been used, the display positions corresponding to the number of input signals are determined in step $S_{54}$. FIGS. 16A to 16C and 17A to 17C show the cases where none of the names of the input signals have been used. As shown in FIGS. 17A to 17C, when only one input is displayed, the name "I/O 001" of the input signal is displayed in a row ($M=M_s+1$) next to a row indicated by the heading position $M_s$ stored in the table TB1. When two inputs are displayed, the first name "I/O 001" is displayed in the row indicated by the heading position $M_s$, and the second name "I/O 002" is displayed in a row ($M=M_s+2$). When three inputs are displayed, the first name "I/O 001" is displayed in a row ($M=M_s$), the second name "I/O 002" is displayed in a row ($M=M_s+1$), and the third name "I/O 003" is displayed in a row ($M=M_s+2$). For a flip-flop circuit having two inputs, however, the name of first input is displayed in a row ($M=M_s+1$), and the name of the second input is displayed in a row ($M=M_s+2$). In these cases where every input is unused, when the above display operation has been completed, a numeral $M_s+3$ is set as the starting position information.

In the case where a used input signal is present, the name of the input signal is displayed in step $S_{55}$. FIGS. 16D to 16I and 17D to 17I show all of the cases where a used input is present. That is, FIGS. 16D and 17D show the case where one input to be displayed has been displayed. FIGS. 16E and 17E show the case where one of two inputs to be displayed has been already displayed. FIGS. 16F and 17F show the case where both of two inputs to be displayed have been already displayed. FIGS. 16G and 17G show the case where one of three inputs to be displayed has been displayed. FIGS. 16H and 17H show the case where two of three inputs to be displayed have been displayed. FIGS. 16I and 17I show the case where all of three inputs to be displayed have been already displayed. In the cases shown in FIGS. 16D, 17D, 16F, 17F, 16I and 17I, all of the names of input signals to be displayed have been displayed. Accordingly, only the cases shown in FIGS. 16E, 17E, 16G, 17G, 16H and 17H will be explained. In these cases, unused input signal names are displayed in rows ($M=M_s$, $M_s+1$, $M_s+2$), in the order described. When the above display operation has been completed, the heading position is shifted to a row next to the last one of the rows displaying the new input(s). That is, numerals $M_s+1$, $M_s+2$, and $M_s+1$ are set as the new heading position in the case shown in FIGS. 16E and 17E, the case shown in FIGS. 16G and 17G, and the case shown in FIGS. 16H and 17H, respectively. After the display position of every unused input signal name has been determined, the display position of the reference input signal line is determined in steps $S_{56}$ to $S_{59}$. FIGS. 18A to 18I show the state of the display surface after the position of the reference input signal line has been determined.

In step $S_{56}$, the number of input signal names is obtained. The reference input signal line is fundamentally indicated by the position of the name of the input signal or the position of the name of the output signal in the case of one input, and by the position of the second input in the case of two or three inputs, as indicated by a mark "◉" in FIGS. 18A to 18I. In more detail, the reference input signal line is given by a picture element ($M=M_s+1$, $L=5$) in the cases shown in FIGS. 18A and 18C, and by a picture element ($M=M_s+2$, $L=5$) in the case shown in FIG. 18B. Further, the reference input signal line is indicated by the position ($M=M_s-2$, $L=12$) of the output signal line "MAAA" in FIG. 18D, by the position ($M=M_s$, $L=5$) of the second input "I/O 001" in FIG. 18E, by the position ($M=M_s-2$, $L=12$) of the second input "TAAA" in FIG. 18F, by the position ($M=M_s$, $L=5$) of the second input "I/O 001" in FIG. 18G, by the position ($M=M_s-2$, $L=12$) of the second input "TAAA" in FIG. 18H, and by the position ($M=M_s-5$, $L=12$) of the second input "TAAA" in FIG. 18I. The position of the reference input signal line is hereinafter indicated by ($M_x$, $L_x$). In the case where two or three inputs are displayed, the position ($M_x$, $L_x$) of the reference output signal line is compared with the position of the other input signal and is corrected if needed, in steps $S_{60}$ and $S_{61}$. That is, when the L-coordinate $L_x$ of reference input signal line is smaller than the (largest) L-coordinate $L_o$ of the other input signal(s), the L-coordinate of reference input signal line is made equal to $L_o$. The position ($M_x$, $L_x$) of the reference input signal line which has been corrected in the above-mentioned manner, is shown in each of FIGS. 19E and 19G. In these cases, $L_x$ is changed from 5 to 12. The above correction is useful in determining the position of a symbol block, as will be described later.

That is, the above correction makes it possible to determine the position ($M_B$, $L_B$) of the reference picture element of a symbol block in accordance with the number of input signals, in steps $S_{62}$ to $S_{64}$. In other words, in the case of one or three inputs, the position ($M_B$, $L_B$) of the reference picture element is indicated by a coordinate ($M_x-1$, $L_x+2$). In the case of two inputs, the position ($M_B$, $L_B$) is indicated by a coordinate ($M_x-2$, $L_x+2$). The position ($M_B$, $L_B$) thus defined is indicated by a mark "×" in FIGS. 20A to 20I. The position ($M_B$, $L_B$) has a coordinate ($M_s$, 7) in FIGS. 20A to 20C. Further, the position ($M_B$, $L_B$) has coordinates ($M_s-3$, 14), ($M_s-2$, 14), ($M_s-4$, 14), ($M_s-1$, 14), ($M_s-3$, 14) and ($M_s-6$, 14) in FIGS. 20D, 20E, 20F, 20G, 20H and 20I, respectively. As shown in FIG. 13, the reference picture element indicates the upper left corner of the symbol block. Accordingly, in FIGS. 20A to 20I, a logic symbol is displayed by 15 picture elements having in the upper left corner thereof the mark "×".

Even if the position for displaying a symbol block has been determined in the above-mentioned manner, it is not always possible to display the symbol block at the determined position. In step $S_{65}$, it is judged whether the symbol block can be displayed at the above position or not. The judgement is formed by checking a corresponding area on each of the used picture element tables TB3 and TB4. In other words, when an area indicating the determined position takes the state of the "0" in each of the tables TB3 and TB4 as shown in FIGS. 15C and 15D, it is allowed to arrange the symbol block at the above-mentioned position. When the above area takes the state "1" in either one or both of the tables TB3 and TB4, such an arrangement is not allowed. In step $S_{66}$, the position of the symbol block is modified, and it is determined whether the symbol block can be arranged at the modified position. In more detail, the position of the symbol block is modified, for example, in such a manner that the position of the reference picture element is modified in the numerical order as shown in FIG. 21 (numeral 9 is missing), and whether the symbol block can be arranged at a modified position or not is checked. When it is judged that the symbol block can be arranged at a modified position, information on the symbol block and on the modified position is sent to the refresh memory 22 and symbol generator 23 to be stored therein.

In steps $S_{68}$ to $S_{71}$, the name of the input signal is checked, and also it is determined whether connection between symbol blocks can be made or not. In step $S_{69}$, it is determined whether a straight line can be drawn between the first input and the symbol block or not. That is, the position information ($M_a$, $L_a$) of the name of first input is compared with the position information ($M_b$, $L_b$) of the first input line of the symbol block. If $M_a=M_b$, it is determined from the used element storing table TB4 whether picture elements between the position ($M_a$, $L_a$) and the position ($M_a$, $L_b$) have been used or not. When these picture elements are not used, it is judged that the straight line can be drawn between the first input and the symbol block. Incidentally, the table TB4 shows the presence of a straight line extended in the L-direction. When the straight line cannot be drawn, it is determined whether a line having one, two, or three turn points can be drawn or not. In this case, the turn at each of the start and end points is not regarded as a turn point. When the number of turn points is large, the above check becomes complicated. Therefore, the number of turn points is made equal to or less than three, in this example. FIGS. 22A to 22D show connection lines having one, two, or three turn points. When a connection line is drawn, it is checked that an area corresponding to each turn point included in the connection line takes the state "0" in both of the tables TB3 and TB4, that an area corresponding to each of the straight lines extended in the L-direction takes the state "0" in the table TB4, and that an area corresponding to each of the straight lines extended in the M-direction takes the state "0" in the table TB3. In the case where any connection line having one, two, or three turn points cannot be drawn, the position for displaying the name of the input signal is rearranged, and the processing in step $S_{52}$ is conducted once more. In this case, it may be desirable to replace the name of the output signal of the logic symbol having been displayed on the display surface. The above name of the output signal is deleted from the table TB2, and displayed again in the signal name displaying column on the display surface. By doing so, it becomes possible in many cases to draw a connection line. When all connection lines have been drawn, information on the connection lines is sent to RAM 22 and the connection lines are displayed, in step $S_{72}$. That is, the conversion program $P_2$ for one logical circuit terminates. Then, the conversion program $P_2$ for another logical circuit starts from step $S_1$ shown in FIG. 10 or step $S_{40}$ shown in FIG. 12, if necessary. Each of FIGS. 23A to 23I shows the final state after connection lines have been added to the circuit shown in a corresponding one of FIGS. 20A to 20I.

Figure 24:
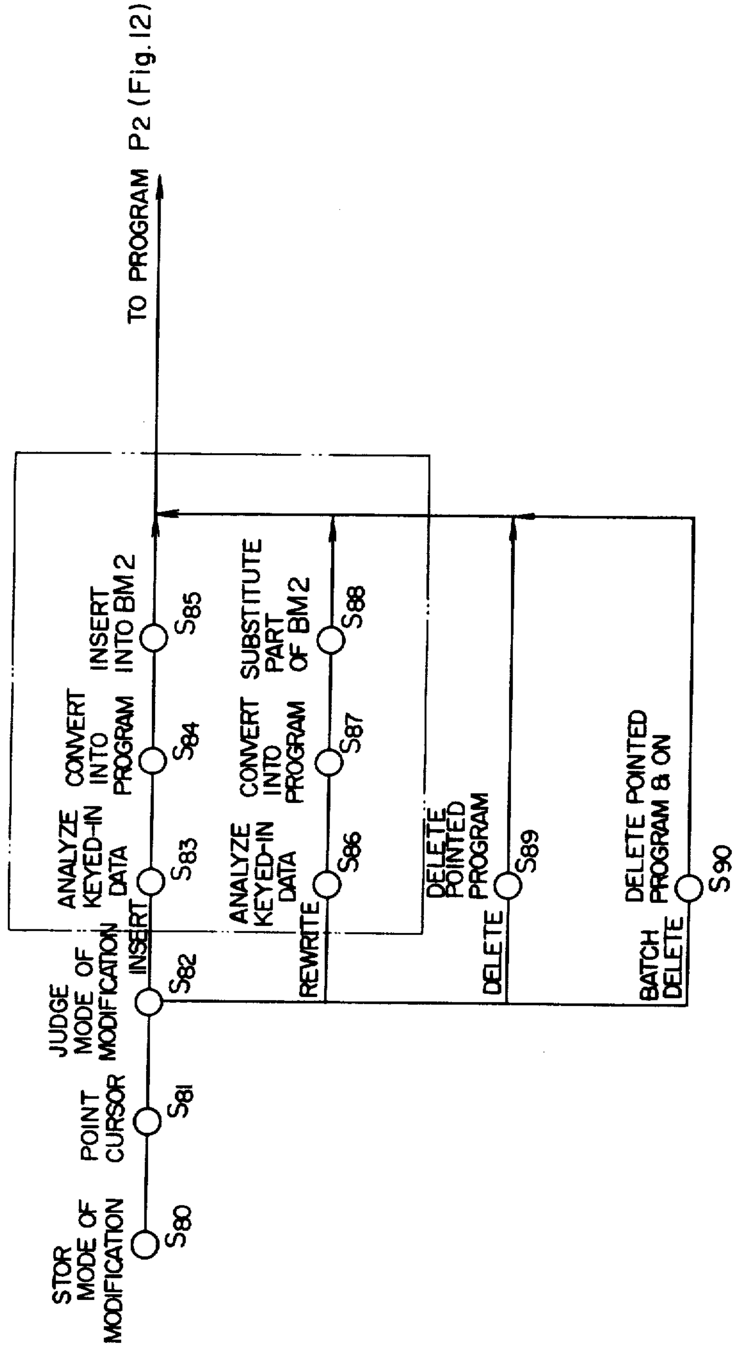
FIG. 24 is a state transition diagram for illustrating the function of the modification program $P_3$ shown in FIG. 7.

Finally, the modification program $P_3$ shown in FIG. 7 is explained with reference to FIG. 24. A program stored in the main memory 33 is read out and transferred to the buffer memory BM2 (shown in FIG. 9), by depressing the circuit read-out key $K_3$. At this time, the conversion program $P_2$ (shown in FIG. 12) for the circuit reading/displaying function is executed, and thus a logical circuit corresponding to a read-out program is displayed on the display surface of the cathode ray tube. Then, any one of the insertion key, rewrite key, deletion key and batch (or blanket) deletion key is depressed, and the modification program shown in FIG. 24 is executed. Referring to FIG. 24, the kind of modification mode is stored in step $S_{80}$. In step $S_{81}$, the cursor is displayed on the display surface of cathode ray tube by operating the cursor keys. A logic symbol is used as the unit in indicating a position by the cursor. When the cursor key "▷" shown in FIG. 6 is first depressed. The cursor is displayed below the symbol AND 1 shown in FIG. 1. The cursor will indicate the symbols AND 2, TD, FF, and OR in the order described, each time the key "▷" is depressed. Detailed explanation of a cursor indication program is omitted for brevity's sake. Briefly speaking, a program unit corresponding to a single logical circuit is taken out, and the position of the symbol block of the logical circuit is judged and indicated by the cursor. In step $S_{82}$, the modification mode is checked. In the case where the insertion is indicated, information inputted by a key-in operation is analyzed using the buffer memory BM1 in step $S_{83}$. In step $S_{84}$, the inputted data is converted into a program. In step $S_{85}$, the program stored in the buffer memory BM1 is inserted into a series of programs, which are stored in the buffer memory BM2, at a position before or after a program corresponding to the logical circuit indicated by the cursor. It is needless to say that the processing in steps $S_{83}$ to $S_{85}$ can be conducted by the same program as employed to conduct the processing in steps $S_1$ to $S_{38}$ (shown in FIG. 10). In the case where the modification mode is the rewriting, substantially the same processing as in steps $S_{83}$ and $S_{84}$ is conducted in steps $S_{86}$ and $S_{87}$. In step $S_{88}$, the program stored in the buffer memory BM1 is substituted for a program which is included in a series of programs stored in the buffer memory BM2 and corresponds to the logical circuit indicated by the cursor.

In the case where the modification mode is the deletion, a program which is included in a series of programs stored in the buffer memory BM2 and corresponds to the logical circuit indicated by the cursor, is deleted in step $S_{89}$. In the case where the modification mode is the batch deletion, a program corresponding to the logical circuit indicated by the cursor and subsequent programs are deleted from a series of programs stored in the buffer memory BM2, in step $S_{90}$. After the processing in steps $S_{85}$, $S_{88}$, $S_{89}$ and $S_{90}$ has been completed, the conversion program shown in FIG. 12 is executed. Thus, a modified circuit pattern is displayed on the display surface of the cathode ray tube. Referring to FIG. 24, a group of steps $S_{83}$ to $S_{85}$ and a group of steps $S_{86}$ to $S_{88}$ are substantially equivalent to the keyed-in input analyzing program $P_1$. Accordingly, the modification program may be considered to be made up of steps $S_{80}$, $S_{81}$, $S_{82}$, $S_{89}$ and $S_{90}$.

As has been explained in detail, according to the present invention, a complicated logic can be displayed since a logic symbol is employed to display a logical circuit, an engineer who can comprehend various logical circuits but lacks the knowledge of computers, can readily modify the logical design, and moreover it is very convenient to monitor a sequential processing since logical circuits are appropriately arranged on the display surface of cathode ray tube.

We claim:

1. In a sequence display apparatus comprising a sequence control device for performing a logical operation between input signals in accordance with a logical operation program to deliver a control signal in accordance with the result of said logical operation, a cathode ray tube control unit for displaying a diagram representing a function corresponding to said logical operation program on the display surface of a cathode ray tube, and a sequence display control unit for converting said logical operation program into data for displaying said logical circuit on said display surface, and for converting data from a keyboard into said logical operation program, the improvement comprising:

said sequence display control unit including means for storing a program and means for carrying out said program, said program including converting the sequence program into a combination of logical circuits having respective input and output signal lines associated therewith and displaying the combination of logical circuits as a combination of conventional logical symbols having respective input and output signal lines connected thereto and interconnection lines drawn between said symbols, on the display surface of said cathode ray tube.

2. A sequence display apparatus according to claim 1, wherein the program further includes displaying the name of a signal for identifying the kind of each of said input and output signals in the vicinity of said input and output lines connected to the logic symbols.

3. A sequence display apparatus according to claim 2, wherein the names of the input signals are collectively displayed in a predetermined part of said display surface, and a connection line is drawn between each of said names of input signals and an input terminal of said symbol.

4. In a sequence display apparatus comprising a sequence control device for performing a logical operation between input signals in accordance with a logical operation program to deliver a control signal in accordance with the result of said logical operation, a cathode ray tube control unit for displaying a logical circuit having a function corresponding to said logical operation program on the display surface of a cathode ray tube, and a sequence display control unit for converting said logical operation program into data for displaying said logical circuit on said display surface, and for converting data from a keyboard into said logical operation program, the improvement wherein said sequence control device, said cathode ray tube control unit and said sequence display control unit are combined so that a symbol indicating the kind of logical function conducted by a logical circuit is displayed, so that each of the symbols corresponding to all kinds of logical functions is arranged in a block having A picture elements in the longitudinal direction and B picture elements in the transverse direction, and so that a signal line is arranged between blocks.

5. A sequence display apparatus according to claim 4, wherein the name of an output signal from said symbol arranged in said block is displayed in said block.

6. A sequence display apparatus according to claim 5, wherein the names of input signals are collectively displayed in a part of said display surface, and a connection line is arranged between each of said names of input signals and an input terminal of said block.

7. A sequence display apparatus comprising a sequence control device for performing a logical operation between input signals in accordance with a logical operation program to deliver a control signal in accordance wit the result of said logical operation, a cathode ray tube control device for displaying a logic circuit having a function corresponding to said logical operation program on the display surface of a cathode ray tube, and a sequence display control device for converting said logical operation program into data for displaying said logical circuit on said display surface, and for converting data from a keyboard into said logical operation program, said keyboard being provided thereon with logical function specifying keys for specifying one of a plurality of logical functions conducted by logical circuits and with keys for specifying the name of the input signal and the name of the output signal, whereby a key-in operation for composing a program is performed in such a manner that one logical function, all of the names of the input signals and the name of the output signal form one set.

8. A sequence display apparatus according to claim 7, wherein in the case where one logical function, all of the names of the input signals and the name of the output signal fail to be inputted as one set when said key-in operation for composing a program is performed, an error message is displayed.

9. In a sequence display apparatus comprising a sequence control unit for performing a logical operation between input signals in accordance with a logical operation program to deliver a control signal in accordance with the result of said logical operation, a cathode ray tube control unit for displaying a diagram representing a function corresponding to said logical operation program on the display surface of a cathode ray tube, and a sequence display control unit for converting said logical operation program into data for displaying said logical circuit on said display surface, and for converting data from a keyboard into said logical operation program, the improvement comprising:

means including a keyboard having logic function keys for specifying the kind of logical function and signal name keys for specifying the name of input and output signals for performing a key-in operation for composing a program; and wherein said sequence display control unit includes means for generating a group of command codes corresponding to the name of the input signal and the name of the output signal, respectively, designated through said keyboard, said group of command codes being determined by the kind of logical function and the number of input signals, whereby a logical operation program for each logical function is composed.

10. A sequence display apparatus according to claim 9, wherein the sequence display control unit includes means for inputting a group of key-in signals including the type of logical function, the name of the input signal and the name of the output signal as one set, means for converting each set of key-in signals to form each logical operation program and means for accumulating successive logical operation programs to obtain a series of logical operation programs for the sequence control unit.

11. In a sequence display apparatus comprising a sequence control device for performing a logical operation between input signals in accordance with a logical operation program to deliver a control signal in accordance with the result of said logical operation, a cathode ray tube control device for displaying a logical circuit having a function corresponding to said logical operation program on the display surface of a cathode ray tube, and a sequence display control device for converting said logical operation program into data for displaying said logical circuit on said display surface, and for converting data from a keyboard into said logical operation program, the improvement wherein said display surface is divided into a first region for displaying a character each time information is inputted from said keyboard by a key-in operation, a second region for displaying a character each time a key-in operation for inputting the name of input signal and the name of output signal is performed and for displaying one logic symbol at a predetermined position in said second region, and a third region for displaying said name of input signal, said name of output signal and said logic symbol after all of said name of input signal, said name of output signal and the kind of logical function have been inputted by a key-in operation.

12. In a sequence display apparatus comprising a sequence control unit for performing a logical operation between input signals in accordance with a logical operation program to deliver a control signal in accordance with the result of said logical operation, a cathode ray tube control unit for displaying a diagram representing a function corresponding to said logical operation program on the display surface of a cathode ray tube, and a sequence display control unit for converting said logical operation program into data for displaying said logical circuit on said display surface, and for converting data from a keyboard into said logical operation program, the improvement comprising:

means for displaying on the display surface of the cathode ray tube a signal name displaying column including the names of input signals collectively and a symbol displaying region for displaying logic symbols;

the sequence display control unit including a first and a second storage table for determining a position of a logic symbol to be displayed in accordance with the position of the name of a signal, said first storage table storing a state of the display in said signal name displaying column, said second storage table storing therein the position on said display surface of an output line of each of the names of the input signals and the position on said display surface of an output line of the name of each output signal, said names of said input signals and said name of said output signal having been displayed on said display surface, said name of said output signal being the name of the output signal from the logic circuit corresponding to said logic symbol.

13. A sequence display apparatus according to claim 12, wherein said sequence display control unit further includes third and fourth storage tables for storing the state of each of said picture elements forming said display surface, the third storage table storing those picture elements used for displaying a logic symbol or for displaying a signal line extended in a vertical direction and the fourth storage table storing those picture elements used for displaying a logic symbol or for displaying a signal line extended in a horizontal direction, whereby the sequence display control unit determines the display of each logic symbol and the connection thereof with the name of the input signal in accordance with the contents of the first, second, third and fourth storage tables.

* * * * *